(12) United States Patent
Le Reverend et al.

(10) Patent No.: US 12,338,044 B2
(45) Date of Patent: Jun. 24, 2025

(54) ATTACHMENT FOR A BEVERAGE CONTAINER

(71) Applicant: SOCIETE DES PRODUITS NESTLE S.A., Vevey (CH)

(72) Inventors: Benjamin Le Reverend, Kirkwood, MO (US); Olivier Breton, Rueyres (CH); Virgile Cavin, Corcelles-le-Jorat (CH); Sarah Brulhart, Bulle (CH)

(73) Assignee: SOCIETE DES PRODUITS NESTLE S.A., Vevey (CH)

( * ) Notice: Subject to any disclaimer, the term of this patent is extended or adjusted under 35 U.S.C. 154(b) by 74 days.

(21) Appl. No.: 18/107,803

(22) Filed: Feb. 9, 2023

(65) Prior Publication Data

US 2023/0264870 A1    Aug. 24, 2023

Related U.S. Application Data

(62) Division of application No. 16/766,903, filed as application No. PCT/EP2018/082455 on Nov. 23, 2018, now abandoned.

(30) Foreign Application Priority Data

Nov. 24, 2017    (EP) .................................... 17203634

(51) Int. Cl.
*B65D 51/28*    (2006.01)
*A47G 19/22*    (2006.01)
(Continued)

(52) U.S. Cl.
CPC ..... *B65D 51/2892* (2013.01); *A47G 19/2272* (2013.01); *B65D 1/323* (2013.01);
(Continued)

(58) Field of Classification Search
CPC ................ B65D 51/2892; B65D 1/323; B65D 81/3227; B65D 81/3244; B65D 51/2807;
(Continued)

(56) References Cited

U.S. PATENT DOCUMENTS 2,078,862 A    2/1935    Llewellyn
2,428,233 A    4/1944    Livadas
(Continued)

FOREIGN PATENT DOCUMENTS

CN    101389542 A    3/2009
CN    101573273 A    11/2009
(Continued)

OTHER PUBLICATIONS

Chinese Office Action for Appl No. 201880072653.7 dated Sep. 23, 2023.
(Continued)

*Primary Examiner* — Bob Zadeh
(74) *Attorney, Agent, or Firm* — Dority & Manning, P.A.

(57) ABSTRACT

An attachment for a beverage container may include a cap configured to attach to an opening in the beverage container. The cap includes an opening. The attachment also include a tube passing through the cap. A beverage in the beverage container can flow through the tube and out of the opening in the cap. The attachment also includes a container attached to the tube and configured to hold a liquid. The container includes an opening to allow the liquid to flow from the container into the tube and out of the opening in the cap. The attachment also comprises a restrictor between the opening of the container and the tube, such that the liquid begins to exit the opening in the cap before the beverage begins to exit the opening in the cap.

2 Claims, 16 Drawing Sheets

(51) Int. Cl.
  *B65D 1/32* (2006.01)
  *B65D 81/32* (2006.01)
  *G01F 11/04* (2006.01)
  *G01F 11/08* (2006.01)

(52) U.S. Cl.
  CPC ..... *B65D 81/3227* (2013.01); *B65D 81/3244* (2013.01); *G01F 11/04* (2013.01); *G01F 11/08* (2013.01)

(58) Field of Classification Search
  CPC ............ B65D 81/3205; A47G 19/2272; A47G 19/2266; G01F 11/04; G01F 11/08
  See application file for complete search history.

(56) References Cited

U.S. PATENT DOCUMENTS

| | | | |
|---|---|---|---|
| 2,387,374 A * | 10/1945 | Watters | G01F 11/265 222/455 |
| 2,979,236 A | 4/1961 | Fahr | |
| 3,246,807 A | 5/1963 | Micallef | |
| 3,171,446 A | 3/1965 | Koch | |
| 3,200,995 A | 8/1965 | Gangwisch | |
| 3,217,931 A | 11/1965 | Farrar et al. | |
| 3,295,727 A * | 1/1967 | Kates | B65D 83/682 222/394 |
| 3,325,056 A * | 6/1967 | Lewis | B65D 83/68 222/146.3 |
| 3,540,623 A * | 11/1970 | Wittke | B65D 83/682 222/94 |
| 3,628,700 A | 12/1971 | Dodoghue | |
| 3,704,814 A | 12/1972 | Ruscitti | |
| 3,705,668 A | 12/1972 | Schwartzman | |
| 3,722,750 A | 3/1973 | Fox, Jr. | |
| 3,844,454 A | 10/1974 | Buchtel | |
| 3,850,346 A * | 11/1974 | Richardson | B65D 81/3227 222/215 |
| 3,874,562 A | 4/1975 | Hazard | |
| 3,878,972 A | 4/1975 | Por | |
| 4,061,253 A | 12/1977 | Rocketfeller | |
| 4,106,673 A | 8/1978 | Donoghue | |
| 4,143,794 A | 3/1979 | Stratford et al. | |
| 4,190,180 A | 2/1980 | Bennet | |
| 4,211,346 A | 7/1980 | Mehra et al. | |
| 4,427,041 A | 1/1984 | Coetzee | |
| 4,585,149 A | 4/1986 | Zulauf | |
| 4,607,762 A | 8/1986 | Zulauf | |
| 4,625,897 A | 12/1986 | Wortley | |
| 4,763,817 A | 8/1988 | Lee | |
| 4,821,923 A | 4/1989 | Skorka | |
| 4,830,226 A | 5/1989 | Kong | |
| 5,009,083 A | 4/1991 | Spinos et al. | |
| 5,009,342 A | 4/1991 | Lawrence et al. | |
| 5,127,553 A | 7/1992 | Weinstein | |
| 5,251,792 A | 10/1993 | Sheen | |
| 5,261,569 A | 11/1993 | Sandwell | |
| 5,323,938 A | 6/1994 | Ceccarelli et al. | |
| 5,348,194 A | 9/1994 | Mascitelli et al. | |
| 5,353,961 A | 10/1994 | Debush | |
| 5,381,930 A | 1/1995 | Kalabakas | |
| 5,514,118 A | 5/1996 | Kummer et al. | |
| 5,570,820 A | 11/1996 | Amoraal | |
| 5,636,765 A | 6/1997 | DeJonge | |
| 5,833,124 A | 11/1998 | Groves et al. | |
| 5,853,111 A | 12/1998 | Bongers et al. | |
| 5,884,816 A | 3/1999 | Hinze | |
| 5,967,377 A | 10/1999 | Glynn | |
| 6,076,708 A | 6/2000 | Ceccarelli et al. | |
| 6,186,367 B1 | 2/2001 | Harrold | |
| 6,199,386 B1 | 3/2001 | Garrett et al. | |
| 6,330,960 B1 | 12/2001 | Faughey et al. | |
| 6,394,364 B1 * | 5/2002 | Abplanalp | B05B 7/2424 239/340 |
| 6,776,303 B2 | 8/2004 | Fripps | |
| 7,331,489 B2 | 2/2008 | Glynn et al. | |
| 7,467,735 B2 | 12/2008 | Rau | |
| 7,731,103 B2 | 6/2010 | Amron | |
| 8,434,647 B2 * | 5/2013 | Aamar | B65D 35/46 222/440 |
| 8,844,742 B2 | 9/2014 | Fujita et al. | |
| 9,120,112 B2 | 9/2015 | Wegener | |
| 9,132,440 B2 | 9/2015 | Chernik et al. | |
| 9,625,299 B2 | 4/2017 | Holden et al. | |
| 9,663,285 B2 | 5/2017 | Albaum | |
| 9,944,509 B2 | 4/2018 | Rumigny et al. | |
| 2005/0067436 A1 | 3/2005 | Pi | |
| 2006/0196885 A1 * | 9/2006 | Leach | A61M 11/06 222/211 |
| 2008/0015667 A1 | 1/2008 | Gross | |
| 2009/0062747 A1 | 3/2009 | Saul | |
| 2011/0031279 A1 | 2/2011 | Aamar | |
| 2012/0301579 A1 | 11/2012 | Lee et al. | |
| 2013/0319915 A1 | 12/2013 | Gellibolian et al. | |
| 2014/0230659 A1 | 8/2014 | Waggoner et al. | |
| 2015/0307265 A1 | 10/2015 | Winn et al. | |
| 2017/0121077 A1 | 5/2017 | Lawson et al. | |
| 2017/0296988 A1 | 10/2017 | Waggoner et al. | |
| 2023/0264870 A1 * | 8/2023 | Le Reverend | B65D 81/3227 215/388 |

FOREIGN PATENT DOCUMENTS

| | | |
|---|---|---|
| CN | 102177078 A | 9/2011 |
| EP | 2215936 A1 | 8/2010 |
| WO | 0100521 | 1/2001 |

OTHER PUBLICATIONS

Japanese Office Action for Appl No. 2020-528045 dated Nov. 8, 2022.

Chinese Office Action for Chinese Appl No. 201880072653.7 dated Apr. 20, 2024, 8 pages.

* cited by examiner

ATTACHMENT FOR A BEVERAGE CONTAINER

CROSS REFERENCE TO RELATED APPLICATIONS

The present application is a divisional of U.S. patent application Ser. No. 16/766,903 filed on May 26, 2020, which is a National Stage of International Application No. PCT/EP2018/082455 filed on Nov. 23, 2018, which claims priority to European Patent Application No. 17203634.5 filed on Nov. 24, 2017, the entire contents of which are incorporated herein by reference.

FIELD

The present teachings relate to an attachment for a beverage container.

BACKGROUND

There is interest in being able to enhance the taste perception of tastants such as sugar (sucrose) and salt (sodium chloride) so as to provide equivalent taste impression in foods and beverages but using lower levels of addition. The World Health Organization (WHO) recommends reducing intake of salt and sugar in developed countries down to 2 g of sodium and 50 g of sugar per capita per day.

Examples of devices capable of containing and dispensing more than one liquid are seen in GB432400A, EP3033297A1, US2016114942A, EP1628885A1, CN2658077Y, EP2653405A1, CN202717089U, WO2015167951A1 and US2007075079A.

SUMMARY

Particular aspects and embodiments are set out in the appended claims.

Viewed from a first aspect, the present teachings can provide an attachment for a beverage container for dispensing liquids which enhance taste perception of tastants such as salt and sugar.

In a particular approach, there can be provided an attachment for a beverage container. The attachment comprises a cap configured to attach to an opening in the beverage container, the cap comprising an opening. The attachment also comprises a tube passing through the cap, wherein the opening in the cap is located proximate to a first end of the tube and a second end of the tube is configured to be located within the beverage container when the cap is attached to the beverage container, such that a beverage contained in the beverage container can flow through the tube and out of the opening in the cap. The attachment also comprises a container attached to the tube and configured to hold a liquid, the container comprising an opening to allow the liquid to flow from the container into the tube and out of the opening in the cap. The attachment also comprises a restrictor between the opening of the container and the tube to control and/or restrict the flow of the liquid from the container into the tube. The restrictor and the tube are configured such that the liquid begins to exit the opening in the cap before the beverage begins to exit the opening in the cap.

Thereby, attachments for beverage containers are provided that can be used to sequentially dispense a liquid and a beverage having differing tastant concentrations for consumption by a user in a manner perceived by the user as a single continuous sip from the attachment.

BRIEF DESCRIPTION OF THE DRAWINGS

Various example embodiments will now be described in detail by way of example only with reference to the following drawings.

DETAILED DESCRIPTION

Figure 1:
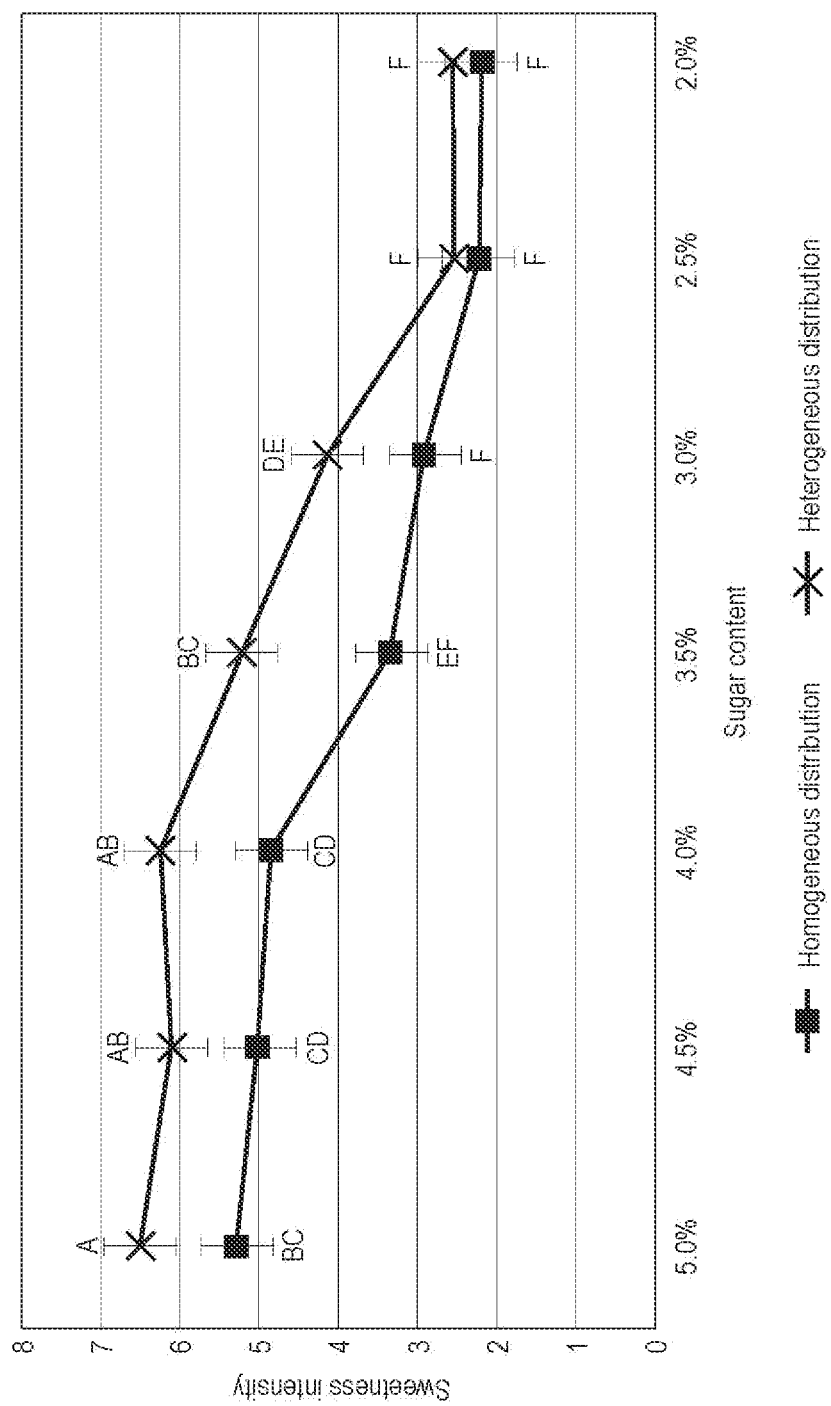
FIG. 1 is a graph of sweetness intensity vs sugar content for the enhancement of sweetness using heterogeneously distributed sucrose in a single sip.

The present disclosure relates to an attachment for a beverage container. The attachment is configured to hold a liquid in a container forming part of the attachment. The attachment is also configured to dispense the liquid contained within the container and the beverage contained within the beverage container. The attachment is therefore configured to dispense multiple liquids having different tastant properties for dispensing the liquids for a user, such as a consumer. The liquid combined with the beverage may form a combined beverage for consumption (i.e. consumable) by a user. The liquid and the beverage may therefore be thought of as first and second portions of the combined beverage. The combined beverage formed by the liquid and the beverage may be any drink, for example a drink typically consumed hot, such as tea, coffee, hot chocolate, or soup, or a drink typically consumed cold such as soda, iced tea, fruit juice, drinking yoghurt or milk. The combined beverage may be a non-carbonated beverage. Either or both of the liquid and the beverage may include a neutraceutical liquid and/or a pharmaceutical liquid.

The differing tastant properties as between the liquid and the beverage may be provided by either one or both of the liquid and the beverage containing an amount or a relatively differing amount of a tastant. The tastant may be sweet, salty, bitter, umami, sour or have flavour. The tastant may comprise more than one component, for example a salty tastant may consist of potassium chloride and ammonium chloride. The ratio of the concentration of tastant in the liquid to the overall concentration of tastant in the beverage may be between 3:1 and 1.1:1. For example, the liquid may contain a tastant absent, present in smaller quantities, or present in a relatively differing amount in the beverage, which may be applicable for tastants seen as generally positive by a user, whereas the liquid may have an absence or reduced quantity of a tastant seen as generally negative by a user.

Part of the liquid and the beverage being consumable together allows a single sip of the combined beverage to comprise both the liquid and the beverage. The total volume of the combined beverage dispensed from the attachment in one dispensing action may therefore be less than or equal to a natural sip volume. A natural sip volume may vary between users based upon factors such as gender, age, vessel size, cup vs. straw sipping, and sequence effects, but may be considered to be approximated by a figure of around 30 ml (see, for example, Dysphagia. 2003 Summer; 18(3):196-202). As discussed further below, various examples of the present approach provide that the attachment may dispense the liquid and the beverage in such manner that a single use of the attachment dispenses some of the liquid and the beverage such that the user consumes a portion of the combined beverage volume as a single sip.

To facilitate the differential delivery of the liquid and the beverage having the differing tastant content, the attachment is configured to provide that the liquid is dispensed substantially before the beverage. As discussed further below, there may be an overlap between ending dispensing of the liquid and starting the dispensing of beverage. By the attachment performing in this manner it is provided that the attachment is able to provide a combined beverage to the user in accordance with the following taste perception principles. When a liquid containing a tastant contacts the tongue before liquid without a tastant, the overall taste impression is strongly influenced by the concentration of tastant in the first liquid to encounter the tongue.

The following 4 examples provide experimental data relating to the sensory perception of sweetness and bitterness in single and multiple sips.

Example 1: Enhancement of Sweetness Using Heterogeneously Distributed Sucrose in Single Sip A trained panel (n=12) was used to capture, through quantitative descriptive analysis, the sweetness of different samples using packaging such as a liquid dispensing apparatus as described herein. A base typical milk chocolate product was used in this example.

The Homogenous samples contained semi-skimmed milk with Y g per liter of sucrose and 40 g per liter of cocoa powder (4%), and both chambers (which could be referred to or considered as first and second containers) of the packaging were filled with this liquid composition. The Heterogeneous samples contained semi-skimmed milk with 2 times Y g per liter of sucrose and 40 g per liter of cocoa powder (4%) in the external chamber of the packaging and semi-skimmed milk 0 g per liter of sucrose (0%) and 40 g per liter of cocoa powder (4%) in the internal chamber of the packaging. Overall, the Heterogeneous samples contained semi-skimmed milk with Y g per liter of sucrose (10%) and 40 g per liter of cocoa powder (4%), just like the Homogenous samples.

Y was varied from 50 g per liter down to 20 g per liter, in decrements of 5 g per liter, leading to seven Heterogeneous and seven Homogenous samples, all described for sweetness by the trained sensory panel. For all Y sucrose content between 50 g per liter and 30 g per liter, the Heterogeneous sample was perceived as more intense than the Homogenous sample of the same concentration. The results are illustrated in FIG. 1, where two samples which are statistically different do not share the same letters. The statistical significance of the differences is visualized in FIG. 1 by displaying the error bars representing the Fisher's least significant difference (LSD) post-hoc multiple comparison analysis computed for factors with an individual error rate of 0.05 (equivalent to a 95% confidence level) (CI).

This sweetness enhancement can also be used to reduce sucrose content, without modifying perceived sweetness, since for example the Heterogeneous sample (Y=35 g per liter=3.5%) is perceived as sweet as the Homogenous sample (Y=50 g per liter=5%), corresponding to a 30% sucrose reduction.

Example 2: Bitterness Masking Using Heterogeneously Distributed Caffeine in a Single Sip A trained panel (n=12) was used to capture, through quantitative descriptive analysis, the bitterness of different samples using the described packaging. A base typical milk chocolate product was used in this example.

The samples contained semi-skimmed milk with sucrose at 50 g per liter (5%), 40 g per liter of cocoa powder (4%) and either:

0 g per liter of caffeine in both chambers (Reference sample);

0.4 g per liter of caffeine in both chambers (Homogenous Bitter);

0.8 g per liter of caffeine in the external chamber (Heterogeneous Bitter OUT);

0.8 g per liter of caffeine in the internal chamber (Heterogeneous Bitter IN).

Figure 2:
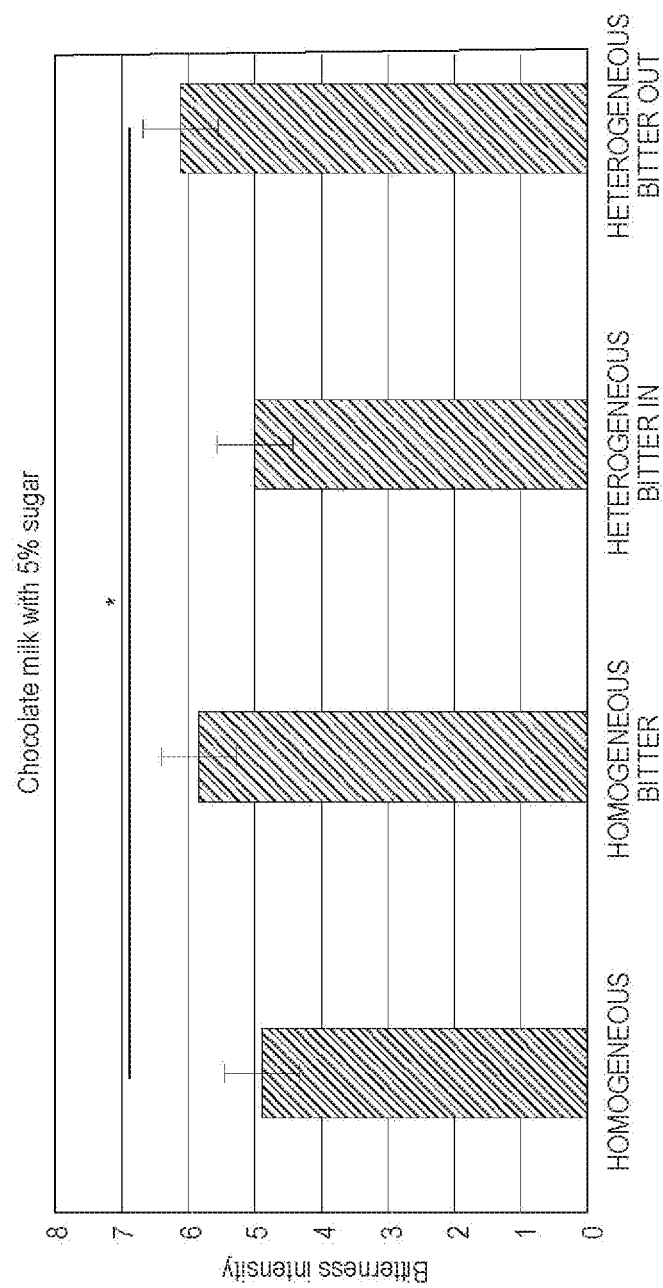
FIG. 2 is a graph of bitterness intensity for different samples of distributed caffeine in a single sip.

The results in FIG. 2 show that the samples ranked in bitterness intensity in the following order: Reference=Heterogeneous Bitter IN<Homogenous Bitter=Heterogeneous Bitter OUT. This demonstrates that the bitterness of caffeine can be reduced to the same level as the Reference sample not containing caffeine when the caffeine is located in the inner chamber (or container).

Example 3: Enhancement of Sweetness Using Heterogeneously Distributed Sucrose in a Multiple Sip Container (which May be Considered as a Vessel Having Two Containers or Chambers to Hold the Different Samples)

A trained panel (n=12) was used to capture, through quantitative descriptive analysis, the sweetness of different samples using the described packaging. A base typical milk chocolate product was used in this example.

The Reference samples contained semi-skimmed milk with 50 g per liter of sucrose (5%) and 40 g per liter of cocoa powder (4%), and both chambers of the packaging were filled with this liquid composition. A negative control reduced in sucrose by 25% contained semi-skimmed milk with 37.5 g per liter of sucrose (3.75%) and 40 g per liter of cocoa powder (4%), and both chambers of the packaging were filled with this liquid composition. The Heterogeneous samples contained semi-skimmed milk with 75 g per liter of sucrose (7.5%) and 40 g per liter of cocoa powder (4%) in the first delivery chamber of the packaging and semi-skimmed milk with 0 g per liter of sucrose (0%) and 40 g per liter of cocoa powder (4%) in the second delivery chamber of the packaging. Overall, the Heterogeneous samples contained semi-skimmed milk with 37.5 g per liter of sucrose (3.75%) and 40 g per liter of cocoa powder (4%), just like the Homogenous samples.

8 packaging prototypes containing 20 ml each (10 ml for each delivery chamber) were used to deliver 160 ml of homogenous reference, homogenous negative control with a 25% reduction of sucrose or heterogeneous prototype with 25% reduction of sucrose.

Figure 3:
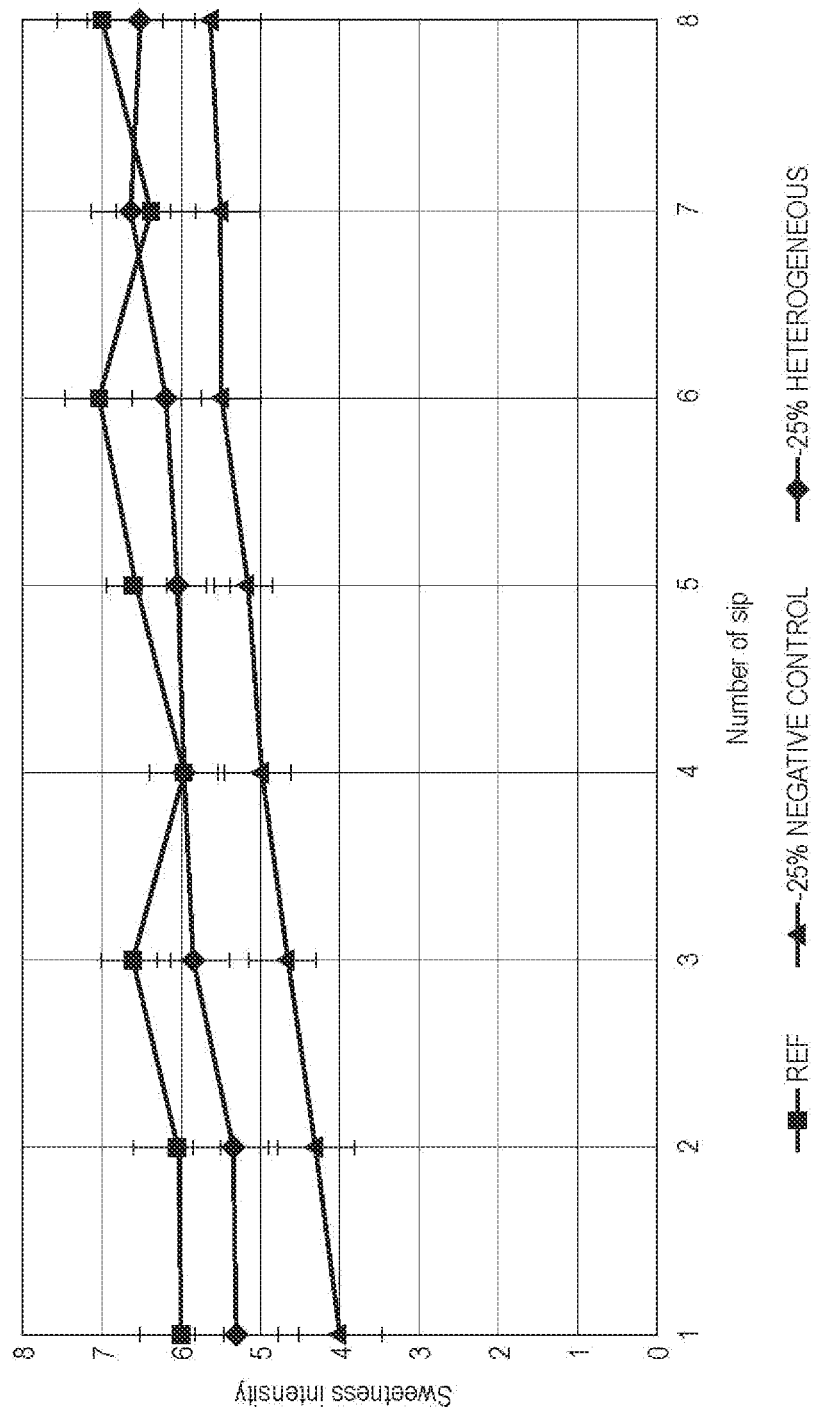
FIG. 3 is a graph of sweetness intensity vs number of sips for the enhancement of sweetness using heterogeneously distributed sucrose using multiple single sip containers.

The results in FIG. 3 show that, along the 8 consecutive sips corresponding to the normal drinking behavior of a 160 ml beverage, the heterogeneous prototype is found to be not significantly less sweet than the full sugar reference, whilst the homogenous negative control with 25% less sucrose was found significantly less sweet than the reference.

Example 4: Sensory Test

The panel was composed of 11 panellists (10 female; 1 male) trained to evaluate the sweetness intensity in liquid applications on a 0-10 intensity scale.

For this study, two strawberry syrup water samples were evaluated in a monadic way (one after the other). These samples were presented in a bottle containing an internal pouch, and pre-filled for each panellist as shown in the table below:

|   | Sample name | Internal chamber (pouch) | External chamber (bottle) |
|---|---|---|---|
| 1 | Homogeneous | Syrup dissolved in water (approximately 30 g) | Syrup dissolved in water (approximately 390 g) |
| 2 | Heterogeneous | Syrup concentrate (approximately 30 g) | Water (approximately 390 g) |

The aim was to evaluate whether heterogeneous distribution of sugar positively impacted sweetness perception along the whole product consumption.

For each sample, the panellists were asked to take 5 consecutive sips (sip number selected to be as much as possible representative of the volume consumed in a regular RTD bottle) and to rate the sweetness intensity perceived after each sip on the 0-10 intensity scale.

For the homogeneous sample, the syrup was pre diluted in Acqua Panna water at the following concentration: 102.4 g syrup (14% sugar when diluted 1:5)/1 L of water (Acqua Panna).

For both samples: the empty bottle was filled first with the 390 g of liquid and the internal pouch was separately filled using a 50 mL syringe. The unit containing the internal pouch (full of liquid), the straw with the balls and the lid were then embedded and screwed to the bottle.

Before the tasting, for each panellist, the following were weighed in the two samples:
  The exact quantity of liquid (syrup concentrate for the heterogeneous sample; syrup diluted for the homogeneous sample) incorporated in the internal pouch
  The exact quantity of liquid (water for the heterogeneous sample; syrup diluted for the homogeneous sample) incorporated in the bottle.

After the tasting, for each panellist, the following were weighed in the two samples:
  The exact quantity of liquid (syrup concentrate for the heterogeneous sample; syrup diluted for the homogeneous sample) remaining in the internal pouch
  The exact quantity of liquid (water for the heterogeneous sample; syrup diluted for the homogeneous sample) remaining in the bottle.

Based on those weight measurements, it was possible to estimate the quantity of syrup consumed by each panellist for each sample after the five sips.

The average sweetness scores obtained by the two samples after each sip was then compared and a Student t test was applied to identify whether the differences observed were significant. The quantity of syrup consumed was then compared and a Student t test was applied to identify whether the difference observed was significant.

Figure 4:
FIG. 4 is a graph showing on the left side the sweetness intensity vs number of sips using a heterogeneously (HT, open circles) or homogeneously (HM, open squares) distributed sucrose based syrup in a multiple sip container as described in FIG. 12A-D. On the right side, the graph shows the amount of syrup over the 5 successive sips during which sweetness intensity was measured.
Figure 4:
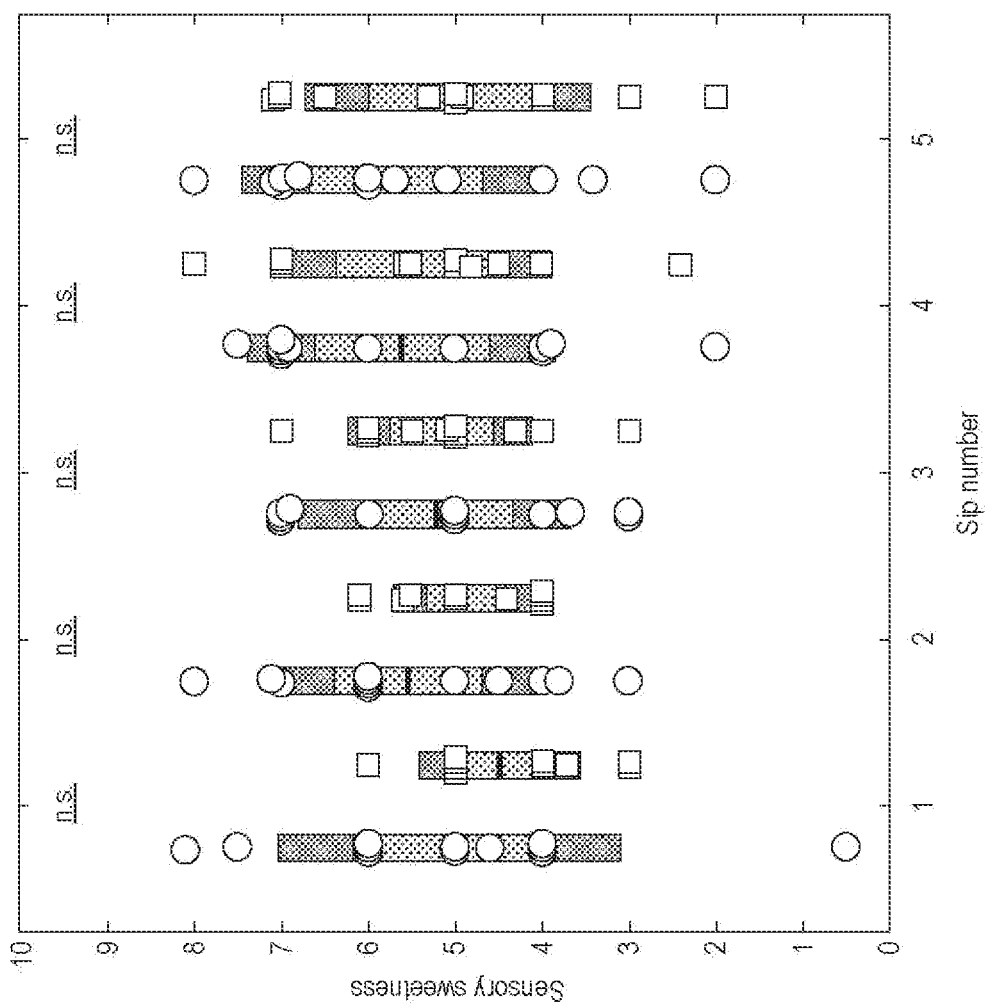
Figure 5:
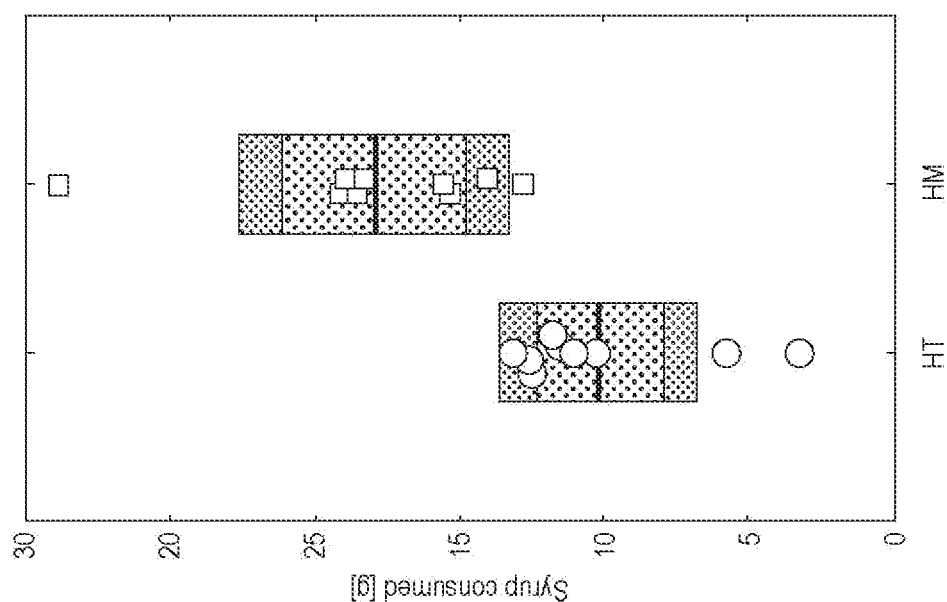
FIG. 5 is a graph showing on the left side the sweetness intensity vs number of sips using a heterogeneously (HT, open circles) or homogeneously (HM, open squares) distributed sucrose based syrup in a multiple sip container as described in FIG. 12A-D. On the right side, the graph shows the amount of syrup over the 5 successive sips during which sweetness intensity was measured.
Figure 5:
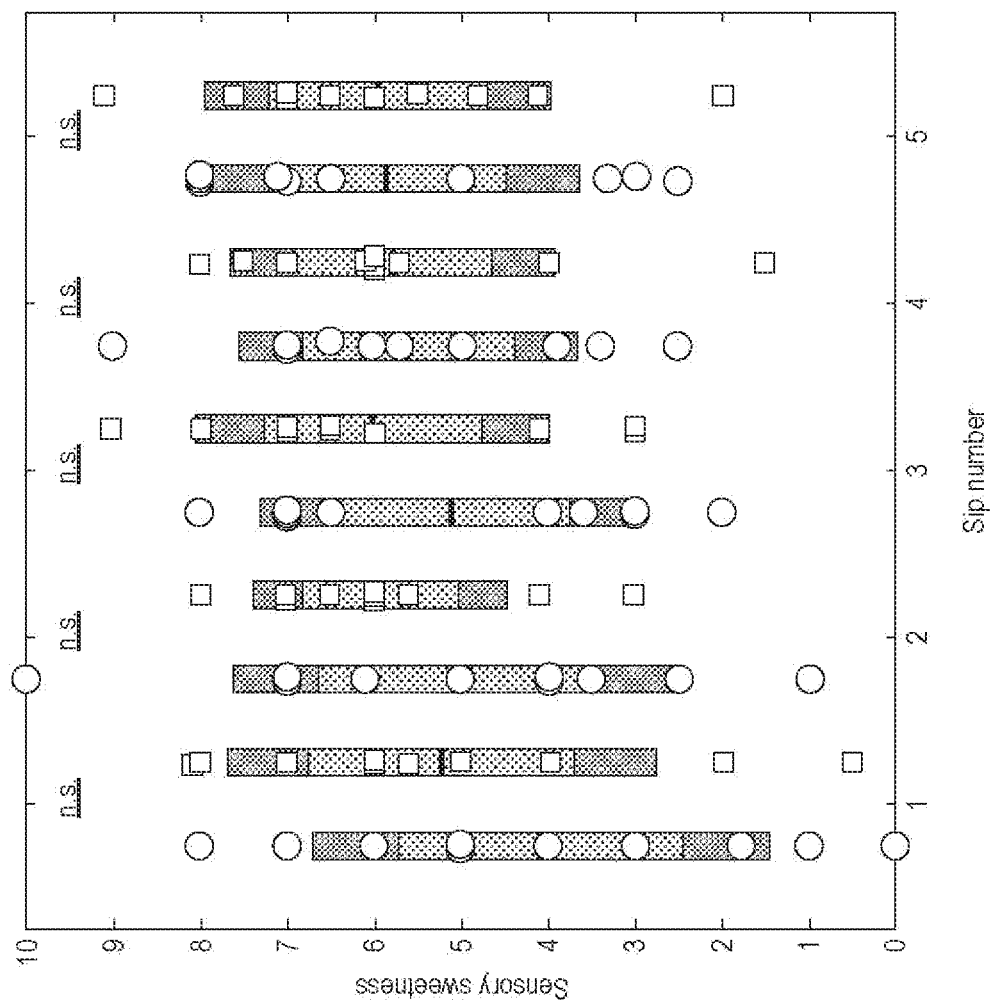

The study was repeated twice and the results are shown in FIGS. 4 and 5. On both occasions, no significant differences (n.s.) in sweetness intensity between the homogenous and heterogeneous samples were observed over 5 consecutive sips. However, also on both occasions, the amount of syrup consumed was significantly lower (p<0.05) in the heterogeneous samples (3.84 g and 10.14 g respectively in the first and second study) than in the homogeneous samples (16.84 g and 17.96 g respectively in the first and second study) after 5 consecutive sips. These two studies therefore demonstrate that using heterogeneously distributing packaging allows significant amounts of caloric sweeteners to be removed without impact the sensory sweetness.

Various examples of attachments for a beverage container and use thereof to provide delivery of a liquid and a beverage as outlined above are now discussed with reference to FIGS. 6 to 16.

Figure 6A:
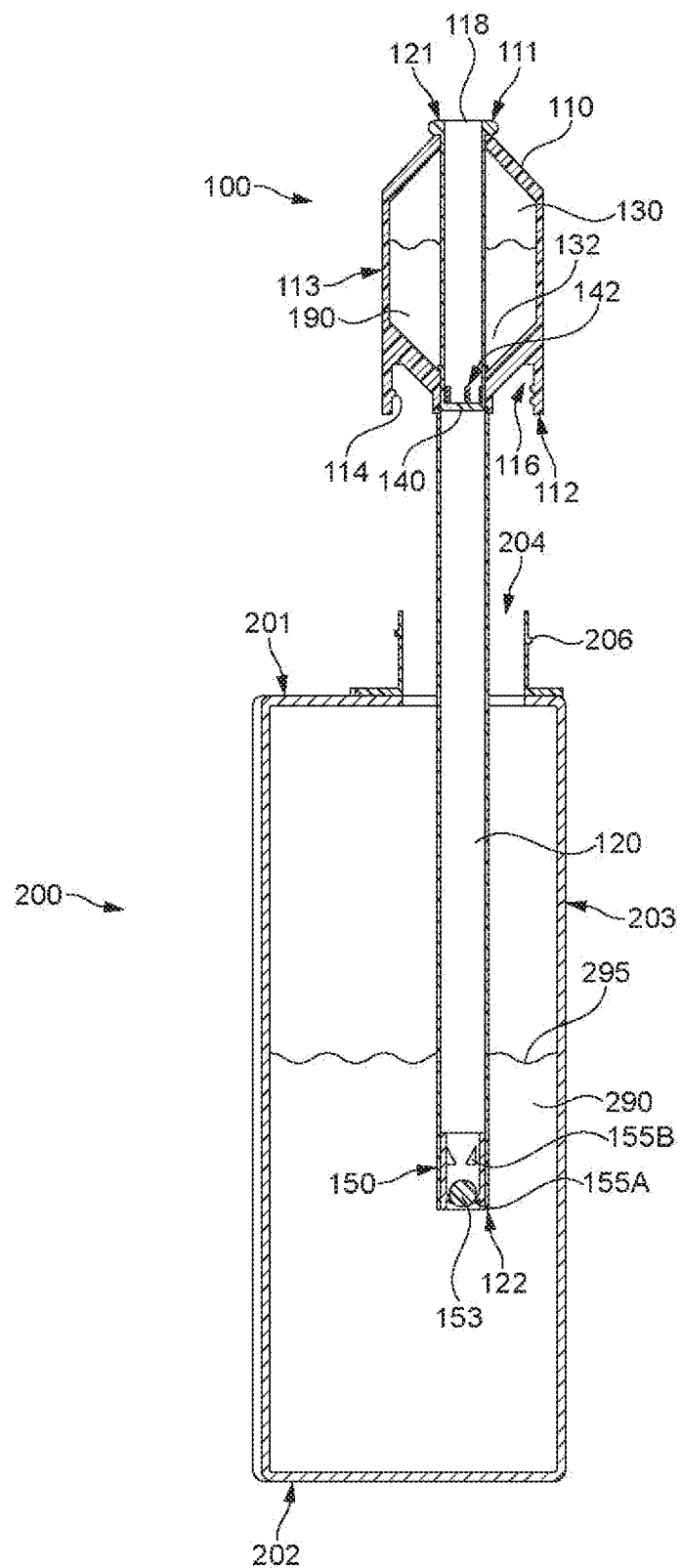
FIGS. 6A and 6B are schematic cross-section views of an example attachment for a beverage container.
Figure 6B:
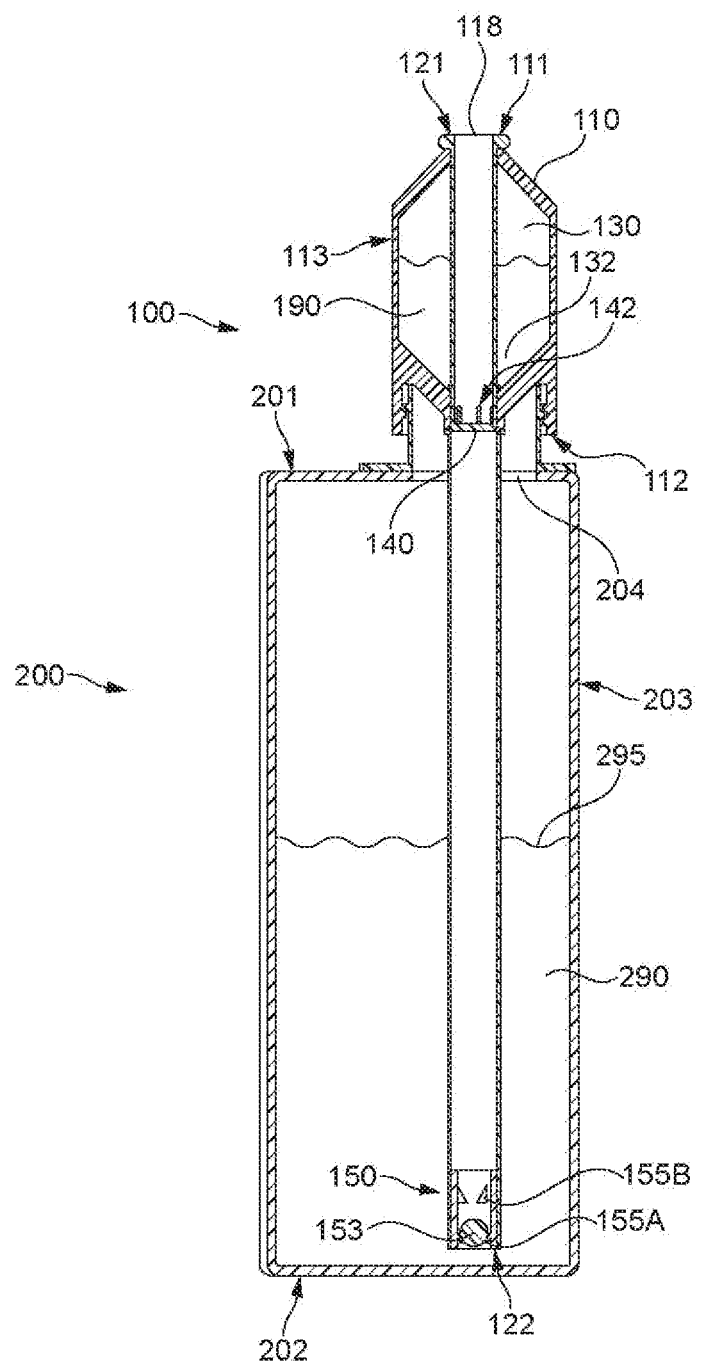

FIGS. 6A and 6B are schematic cross-section views of an example attachment 100 for a beverage container 200. FIG. 6A is an exploded cross-section view, illustrating the attachment 100 separated from the beverage container 200, whilst FIG. 6B is a cross-section view illustrating the attachment 100 attached to the beverage container 200.

The beverage container has a first end 201, a second end 202 opposite the first end 201, and one or more side walls 203. The ends and/or the one or more side walls 203 of the beverage container 200 form an external shape of the beverage container 200. The beverage container 200 has an opening 204. The beverage container 200 may be any conventional beverage container as known in the art, such as a plastics or glass drinks bottle, cardboard milk or juice carton, or a metal can. The beverage container 200 may be provided as a sealed container containing a beverage 290, with a cap, top or other suitable sealing element attached to the opening 204 in the beverage container 200. Alternatively, the beverage container 200 may be provided without a beverage 290, allowing the user to fill the beverage container 200 with their choice of beverage. The sealing element may be attached by a screw fit, an interference fit or any other suitable attachment means. The sealing element therefore retains the beverage such as to impede or prevent the beverage 290 contained in the beverage container 200 from leaking or spilling out of the beverage container 200 during transit or storage of the beverage container 200 or if the beverage container 200 is knocked or tipped over. The beverage 290 in the beverage container 200 may be a drink typically consumed hot, such as tea, coffee, hot chocolate, or soup, or a drink typically consumed cold such as soda, iced tea, fruit juice, drinking yoghurt or milk. The beverage 290 may be a non-carbonated beverage and/or may include a neutraceutical liquid and/or a pharmaceutical liquid.

The attachment 100 for the beverage container 200 comprises a cap 110. The cap has a first end 111, a second end 112 opposite the first end 111, and one or more side walls 113. The cap 110 is configured to attach to the opening 204 in the beverage container 200. The one or more side walls 113 of the cap 110 form an external surface of the cap 110. The external surface of the cap 110 may form a cross-sectional shape which is substantially the same as the cross-sectional shape of the beverage container 200. For example, the cap 110 and the beverage container 200 may both be substantially circular in cross-section. Alternatively, the external surface of the cap 110 may form a cross-sectional shape which is different to the cross-sectional shape of the beverage container 200. For example, the cap 110 may be substantially circular in cross-section whilst the beverage container 200 may be square or rectangular in cross-sectional area.

In use, the sealing element of the beverage container may be removed and the attachment 100 attached to the beverage container 200 in place of the sealing element. The cap 110 of the attachment 100 is configured to attach to the opening 204 in the beverage container 200 by the same means as the sealing element.

In the example illustrated in FIG. 6, the opening 204 in the beverage container comprises a screw thread 206. Although not illustrated, the beverage container may have originally been provided with a sealing element that was screwed onto the screw thread 204 around the opening 204 in order to attached to and seal the beverage container 200. The cap 110 also comprises a screw thread 114 on an interior face 116 of the cap 110. Having removed the sealing element from the beverage container 200, the cap 110 can be screwed onto the opening 204 in the beverage container 200 in order to attach the cap 110 to the opening 204 in the beverage container 200 and thereby sealing the beverage container 200. The cap 110 may also comprise a sealing device, such as an elastomeric O-ring on the interior face 116 of the cap 110 in order to further seal the opening 204 in the beverage container 200, thereby preventing the beverage 290 contained in the beverage container 200 from leaking or spilling out of the beverage container 200, for example if the beverage container 200 is knocked or tipped over. The one or more side walls 113 of the cap 110 may be gnarled, roughened or otherwise textured so as to provide an external surface which can be easily gripped by the user when screwing the cap 110 onto the beverage container 200. Alternatively or in addition, the cap 110 may comprise four or more side wall such as to create the appearance of a square, hex or octagon nut, which may be gripped by the user or a tool, such as a spanner, in order to screw or otherwise attach the cap 110 onto the beverage container 200.

Figure 8A:
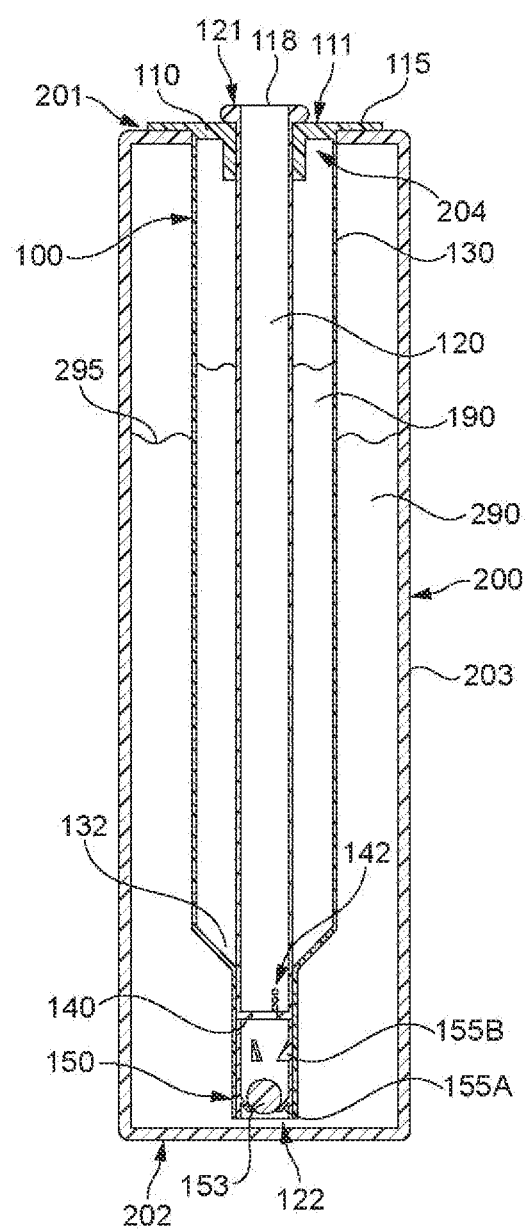
FIGS. 8A and 8B are schematic cross-section views of another example of an attachment for a beverage container.
Figure 8B:
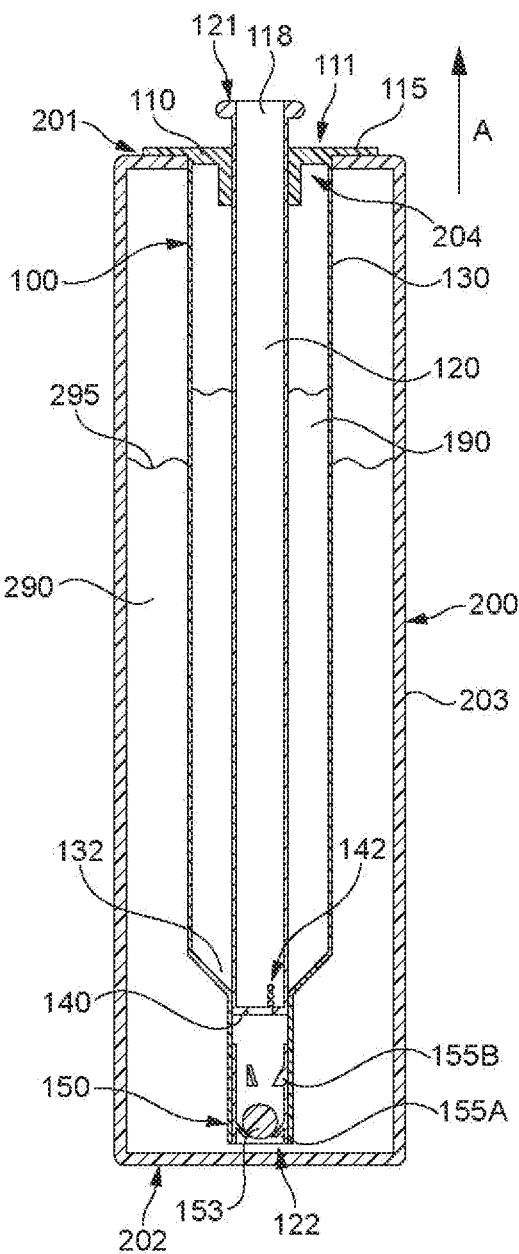

In another example illustrated in FIGS. 8A and 8B, the cap 110 is press fit against the opening 204 in the beverage container 200 in order to attach to and seal the beverage container 200. The one or more sidewalls 113 of the cap 110 are configured to abut against and provide a press fit with the internal surface of the opening 204 in the beverage container 200. In this example, the cross-sectional shape of the cap 110 formed by the one or more side walls 113 is configured to match the cross-sectional shape of the internal surface of the opening 204 in the beverage container 200. In the example illustrated in FIGS. 8A and 8B the cap 110 has a flange 115 surrounding the opening 204 in the beverage container and which presses against the first end 201 of the beverage container 200 when the cap is positioned in the beverage container, in order to provide a larger contact surface between the cap 110 and the beverage container 200, thereby improving the sealing provided by the cap 110. In some examples, the flange 115 and the corresponding portion of the first end 201 of the beverage container 200 may be bonded in some way, for example using a heat bond or an adhesive bond. Accordingly, the attachment 100 can be designed to fit any conventional beverage container by adapting the cap 110 in order for the cap 110 to be attachable to an opening in the beverage container.

The cap 110 also comprises an opening 118. In the example illustrated in FIG. 6B, the opening 118 is at the first end 111 of the cap 110 and the cap 110 is attached to the beverage container 200 at the second end 112 of the cap 110 such that the opening 118 is at the opposite end of the cap 110 to the beverage container 200. Alternatively, the opening 118 may be in one or the one or more side walls 113 or may be located at the same end of the cap 110 as the beverage container 200 is attached to.

The attachment 100 also comprises a tube 120. The tube 120 passes through the cap 110, wherein the opening 118 in the cap 110 is located proximate to a first end 121 of the tube 120. As illustrated in FIGS. 6A and 6B, the tube 120 extends from the first end 121 proximate to the opening 118 in the cap such that the tube 120 passes through the cap 110 and beyond the second end 112 of the cap 110 to a second end 122 of the tube 120. The second end 122 of the tube 120 is configured to be located within the beverage container 200 when the cap 110 is attached to the beverage container 200, as illustrated in FIG. 6B. The length of the tube 120 may be such that, when the cap 110 is attached to the beverage container 200, the second end of the tube 122 is proximate to the second end of the beverage container 200. This ensures that, when the beverage container is held upright, the fluid level 295 of the beverage 290 is above the second end 122 of the tube 120. Alternatively, the length of the tube 120 may be such that the tube 120 only extends partially into the beverage container 200, for example such that the second end 122 of the tube 120 is proximate to the first end 201 of the beverage container 200.

The beverage 290 contained within the beverage container 200 can flow through the tube 120 and out of the opening 118 in the cap 110. For example, when the beverage container 200 is tilted or tipped, or when suction is applied to the opening 118 in the cap 110, the beverage can flow into the second end 122 of the tube 120, along the length of the tube 120 and out the first end 121 of the tube 120 at the opening 118 in the cap 110 such that the beverage 290 flows out of the opening 118 in the cap 110.

The attachment 100 also comprises a container 130 attached to the tube 120. The container 130 is configured to hold a liquid 190. In an example illustrated in FIGS. 6A and 6B, the container 130 is located entirely within the cap 100. As illustrated in FIGS. 6A and 6B, this allows the width or diameter of the container 130 to be greater than the width or diameter of the opening 204 in the beverage container 200, thereby allowing a larger container 130 to be provided, and thus a greater volume of liquid 190. Alternatively, as illustrated in FIGS. 8, 9, and 11, only a portion of the container 130 may be located within the cap 110. In the example illustrated in FIGS. 8A and 8B, the remaining portion of the container 130 not located within the cap 110 extends into the beverage container 200. In this example, the width or diameter of the container 130 is equal to or less than the width or diameter of the opening 204 in the beverage container 200 in order to allow the container 130 to pass through the opening 204 and into the beverage container 200 such that the cap 110 can be attached to the opening 204 in the beverage container 200 as illustrated in FIGS. 8A and 8B. In each of the examples illustrated in FIGS. 6-11, the tube 120 extends through the container 130.

In another example illustrated in FIGS. 12 and 13, the container 130 is separate and separable from the cap 110. In this example, the container 130 is substantially spherical in shape, but the container 130 may be formed into any other suitable shapes such as cubic, cylindrical, tetragonal or frustoconical. The container 130 is configured to be located entirely within the beverage container 200 when the cap 110 is attached to the beverage container 200. The container 130 may be resiliently deformable, such that the container 130 can be deformed and squeezed through the opening 204 in the beverage container 200, before returning to its originally, undeformed shape inside the beverage container 200. This allows the undeformed width or diameter of the container 130 to be greater than the width or diameter of the opening 204 in the beverage container 200. Pressure from a quantity of beverage 290 surrounding the container 130 may enhance the flowrate of the liquid 190 out of the container 130.

In the example illustrated in FIGS. 12 and 13, once the container 130 is located inside the beverage container, it may be configured to be refillable, such that the liquid 190 can be replenished after each use without removing the container 130 from the beverage container 200. For example, the cap 110 and tube 120 may be removable from the container, thereby allowing the beverage container 200 to be refilled with beverage 290 by pouring the beverage 290 and the liquid 190 through the opening 204 in the beverage container 200 and into the beverage container 200 and the container 130 respectively. The cap 110 and tube 120 can then be reattached to the beverage container 200 and the container 130 respectively in order for the beverage container 200 and attachment 100 to be reused. Alternatively, the beverage container 200 and/or attachment 100 may only be intended for a single use and discarded after use.

Figure 14A:
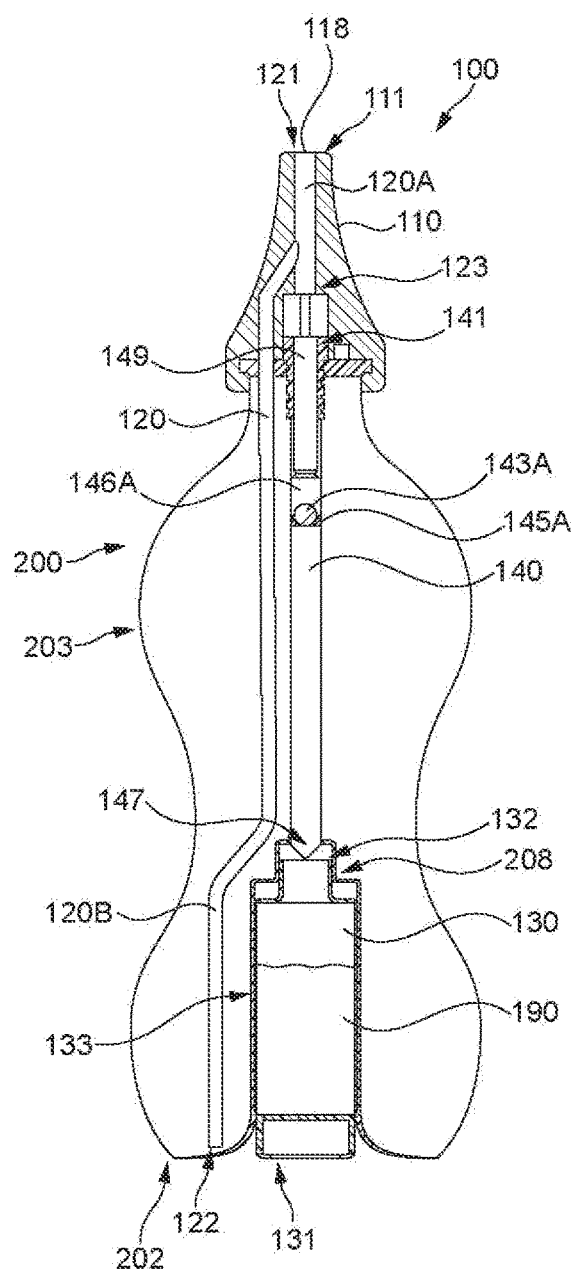
FIGS. 14A and 14B are schematic cross-section views of another example of an attachment for a beverage container.
Figure 14B:
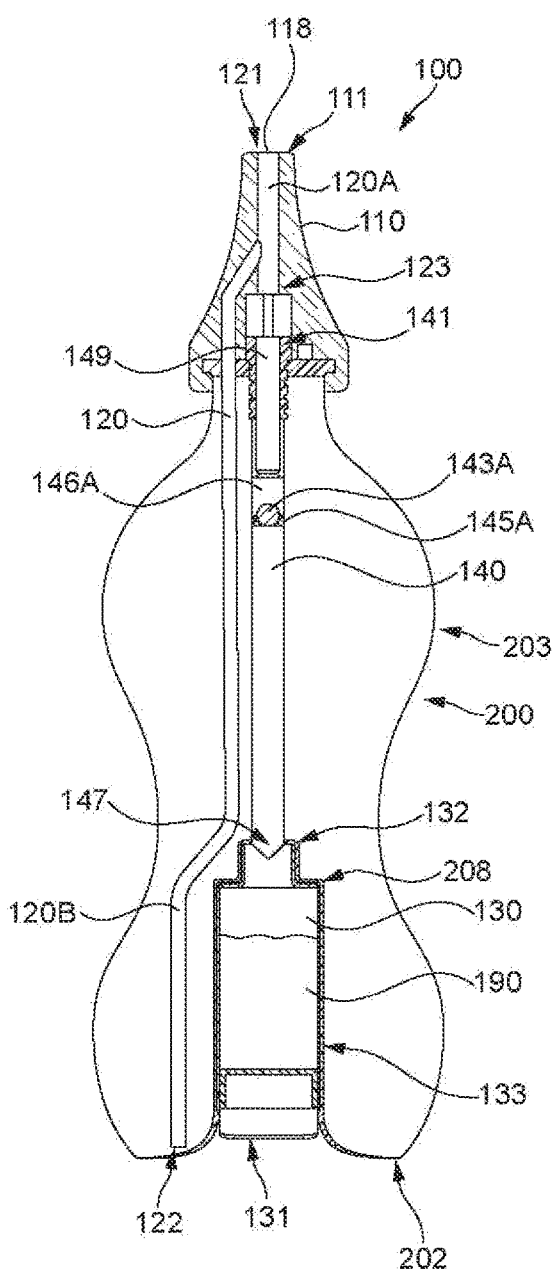

In another example illustrated in FIG. 14, the container 130 is separate and separable from the cap 110 and the beverage container 200. In this example, the second end 202 of the beverage container 200 is indented to form a recess 208. The container 130 can then be inserted and removed from the recess 208 in the beverage container 200 such that the container 130 is located at the end 202 of the beverage container 200 that is distal to the opening 204 in the beverage container 200 to which the cap 110 is attached. In the example illustrated in FIG. 14, the container 130 is inserted into the recess 208 in the beverage container 200 and held in place by a push fit connection between the mating faces of the container 130 and the recess 208 in the beverage container 200. FIG. 14A illustrates the container 130 located partially within the recess 208 in the beverage container 200, such as to not be mated via the push fit connection. On the other hand, FIG. 14B illustrates the container 130 attached to the recess 208 by the push fit connection such that the container 130 is located as far into the recess 208 in the beverage container 200 as it will fit. A first end 131 of the container 130 is opposite an opening 132 in the container 130. The side walls 133 of the container proximate to the first end 131 of the container are indented to allow a user to grip the container 130 at the first end 131 of the container 130 and pull the container 130 towards the second end 202 of the beverage container 200, thus removing the container 130 from the recess 208 in the beverage container 200. Alternatively, the container 130 may be screwed, glued or otherwise attached to the recess 208 in the beverage container 200. The container 130 and the recess 208 in the beverage container 200 may be configured such that the container 130 cannot be removed from the recess 208 in the beverage container.

In the example illustrated in FIG. 14B, the container 130 is configured to be located entirely within the recess 208 in the beverage container 200 such that the container 130 does not protrude beyond the second end 202 of the beverage container 130. This allows second end 202 of the beverage container 200 to provide a stable base for the beverage container 200 such that the beverage container 200 can be stored upright on a surface with the second end 202 of the beverage container 200 in contact with the surface. In another example, the container 130 may be configured to fit partially within the recess 208 and to partially extend beyond the recess 208. In such an example, the shape of the container 130 may be such as to provide a base for the beverage container 200 as well as being received within the recess 208. In a further alternative example, the second end 202 of the beverage container 200 may be provided without a recess 208 to receive the container 130. In such an example, the container 130 is, instead, attached directly to the second end 202 of the beverage container. For example, the container 130 may be substantially the same cross-ssectional shape as the second end 202 of the beverage container 200 such that, when the container 130 is attached to the second end 202 of the beverage container 200, the container 130 provides a base for the beverage container 200.

In the example illustrated in FIG. 14, the container 130 can be removed from the recess 208 in the beverage container 130 when the liquid 190 has been exhausted from the container 130. The container 130 can then be refilled with liquid 190 and re-inserted into the recess 208 in the beverage container 200 or the container 130 can be discarded and a new container 130 inserted into the recess 208 in the beverage container in its place. This allows containers 130 holding different liquids 190, such as different flavours of liquid or liquids with different concentrations of a particular tastant, to be used with the same beverage container 200 and attachment 100.

In each of the examples the container 130 comprises an opening 132 to allow the liquid 190 to flow from the container 130 into the tube 120 and out of the opening 118 in the cap 110. The attachment also comprises a restrictor 140 between the opening 132 of the container 130 and the tube 120 to control and/or restrict the flow of the liquid 190 from the container 130 into the tube 120. The restrictor 140 and the tube 120 are configured such that the liquid 190 begins to exit the opening 118 in the cap 110 before the beverage 290 begins to exit the opening 118 in the cap 110.

In each of the examples illustrated in FIGS. 6A, 6B and 8, the tube 120 extends through the container 130, such that tube 120 forms an internal surface in the container 130. The restrictor 140 creates the opening 132 in the container 130 on the internal surface in the container 130 formed by the tube 120, such that the liquid 190 is able to flow from the container 130 inwards into the tube 120 by passing through the restrictor 140.

In the example illustrated in FIGS. 12 and 13, the opening 132 in the container 130 is orientated towards the opening 118 in the cap 110 and the restrictor 140 is located between the opening 132 in the container 130 and the tube 120. The restrictor 140 joins to the tube 120 within the cap 110 such that the liquid 190 can flow out of the opening 132 in the container 130, through the restrictor 140, into the tube 120 and out of the opening 118 in the cap 110. Alternatively, the restrictor 140 may join to the tube 120 outside of the cap 110, for example within the beverage container 200, such that only the tube 120 extends into and through the cap 110.

In the example illustrated in FIG. 14, the restrictor 140 extends from a first end 141 in the cap 110 through the beverage container 200 to a second end 147 at the recess 208 in the beverage container 200. The second end 147 of the restrictor therefore forms an opening in the recess 208 in the beverage container 200. In the example illustrated in FIG. 14, the container is provided with a seal over the opening 132 in the container, such as a metallic foil or plastic sheet. The second end 147 of the restrictor is shaped such that it pierces the seal over the opening 132 in the container 130 when the container 130 is inserted into the recess 208 in the second container 200. This creates a hole in the opening 132 in the container, thereby allowing the liquid 190 to flow out of the container 130, through the restrictor 140 and the cap 110 and out of the opening 118 in the cap 110. The second end 147 can be considered as being an inlet opening for receiving liquid from the container 130.

Figure 7A:
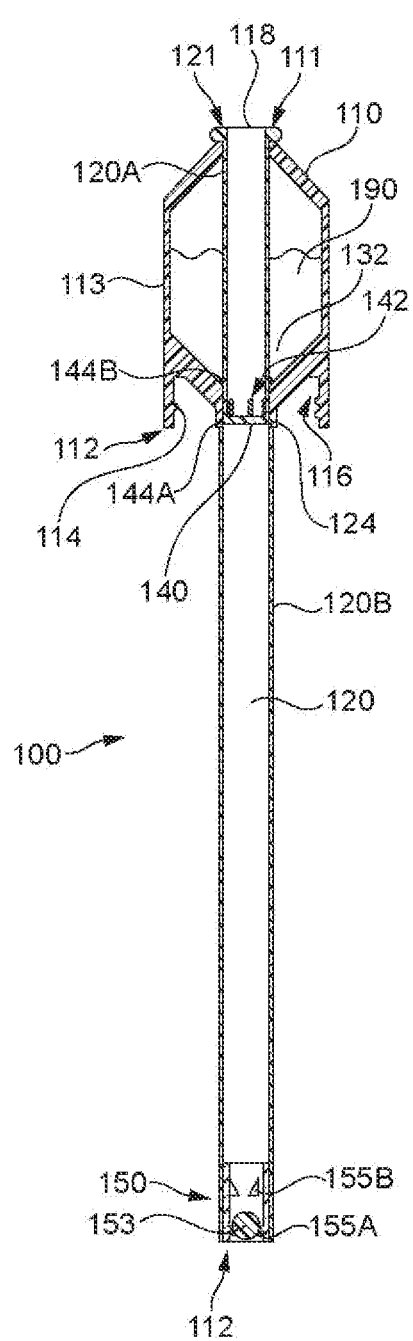
FIGS. 7A and 7B are schematic cross-section views of the example attachment for a beverage container illustrated in FIGS. 6A and 6B.
Figure 7B:
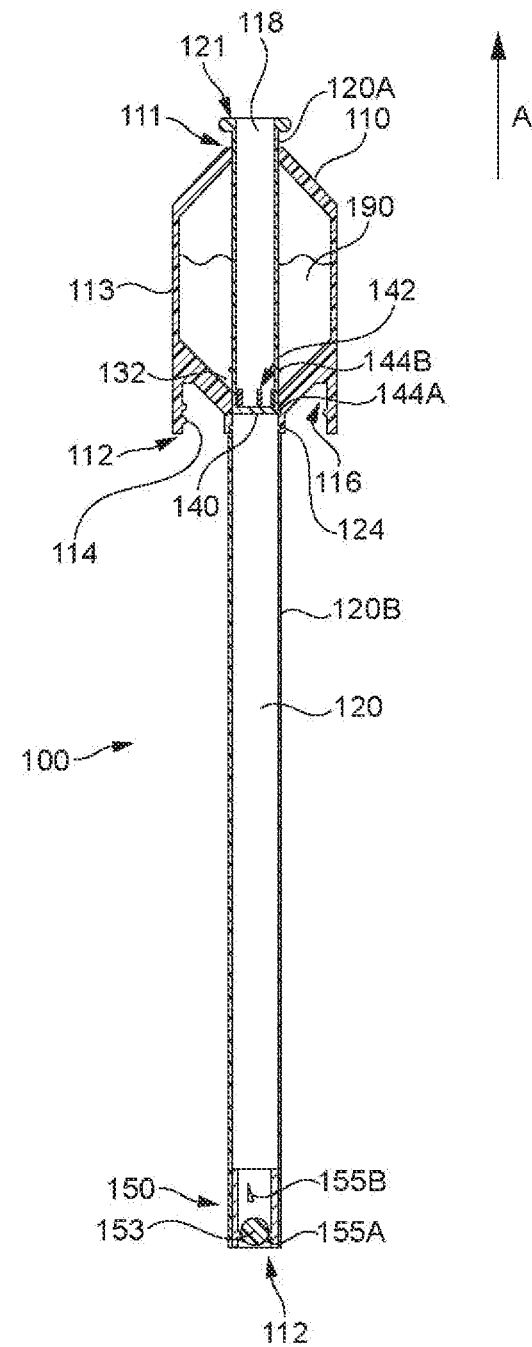

FIGS. 7A and 7B are schematic cross-section views of the example attachment 100 for a beverage container 200 illustrated in FIGS. 6A and 6B. In the example illustrated in FIGS. 7A and 7B, the restrictor 140 has an open and a closed position. FIG. 7A illustrates the attachment 100 with the restrictor 140 in the closed position and FIG. 7B illustrates the attachment 100 with the restrictor 140 in the open position. The restrictor 140 in the closed position prevents the liquid 190 from flowing from the container 130. In the example illustrated in FIGS. 7A and 7B, the restrictor 140 comprises one or more holes 142. In the closed position, as illustrated in FIG. 7A, the one or more holes 142 are located below and outside the container 130. The tube 120 therefore seals the internal surface of the container 130 and restrains or prevents the liquid 190 from flowing from the container 130 into the tube 120. The restrictor 140 is translated in a first direction, as indicated by the arrow A, in order to transition the restrictor 140 from the closed position to the open position. In the open position, as illustrated in FIG. 7B, the one or more holes 142 are located inside the container 130, thereby creating the opening 132 in the container 130 such that the liquid 190 is able to flow from the container 130 inwards into the tube 120 by passing through the one or more holes 142. In the open position, the first end 121 of the tube 120 extends beyond the opening 118 in the first end 111 of the cap 110. This provides a visual indication to the user that the restrictor 140 is in the open position.

In the example illustrated in FIGS. 7A and 7B, the restrictor 140 has one or more notches 144A, 144B. The notches 144A and 144B are configured to engage with one or more grooves or slots 124 in the tube 120 in order to secure and hold the restrictor 140 in the open and closed positions such that a force is required to transition the restrictor 140 from the closed position to the open position and vice-versa. This also prevents misuse of the attachment 100, for example by preventing the user from translating the restrictor 140 too far in the first direction A. In the embodiment illustrated in FIGS. 7A and 7B, only the top portion 120A of the tube 120 corresponding to section of the tube 120 containing the restrictor 140 is translated in the first direction. The remaining portion 120B of the tube 120 remains fixed and is not translated. This means that the second end 122 of the tube 120 remains in a fixed position relative to the beverage container 200, for example a predetermined distance from the second end 202 of the container. Alternatively, the entire tube 120 may be translated when the restrictor 140 is translated from the closed position to the open position and vice-versa.

Additionally, the attachment may further comprise a second restrictor 150 within the tube 120 to control and/or restrict the flow of the beverage 290 through the tube 120 and out of the opening 118 in the cap 110 of the attachment 100. This provides that, with every sip, the liquid 190 begins to exit the opening 118 in the cap 118 before the beverage 290 begins to exit the opening 118 in the cap 110, for example by providing a differential flow rate between the first restrictor 140 and the second restrictor 150. Alternatively, the attachment 100 may not contain a second restrictor 150 and instead the tube 120 may be configured to be resiliently deformable, such that when suction is applied to the opening 118 in the cap 110, the tube 120 deforms inwardly, thereby controlling and/or restricting the flow of the beverage 290 through the tube 120 and thus ensuring that liquid 190 begins to exit the opening 118 in the cap 118 before the beverage 290 begins to exit the opening 118 in the cap 110. The tube 120 may be configured such that only the portion of the tube below the first restrictor 140 is resiliently deformable, thus providing that only the flow of the beverage 290 is restricted by the tube 120.

In the embodiment illustrated in FIGS. 6 and 7, the second restrictor 150 is a non-return valve, such as a ball valve 153, and is located proximate to the second end 122 of the tube 120. The second restrictor 150 therefore also restrains or prevents the liquid 190 from flowing through the tube 120 and into the beverage container 200 whilst also restraining or preventing the beverage 290 from flowing back into the beverage container 200. When the ball valve 153A is located in a first seat 155A, any liquid 190 or beverage 290 is prevented from flowing into the beverage container 200 through the second end 122 of the tube 120. When pressure is applied to the second restrictor 150, for example by applying suction on the first end 121 of the tube 120, squeezing or otherwise applying pressure to the one or more sidewalls 203 of the beverage container 200 or rotating the attachment 100 and beverage container 200, the beverage 290 begins to flow out of the beverage container 200 and into the second end 122 of the tube 120. This forces the ball valve 153 out of the first seat 155A of the ball valve 153 and allows the beverage 290 to flow around the ball valve 153 and down the tube 120 towards the first end 121 of the tube 120. The ball valve 153 has a second seat 155B which limits the movement of the ball valve 153 and prevents the ball valve 153 from travelling along tube 120 and contacting the first restrictor 140. A spring or other biasing means may be used in place of the second seat 155B of the ball valve 153 in order to limit the movement of the ball valve 153 whilst also acting to return the ball valve 153 back into the first seat 155A.

Thus there has now been described a first example of an attachment 100 for a beverage container 200 that can be used to sequentially dispense a liquid 190 and a beverage 290 having differing tastant concentrations for consumption by a user in a manner perceived by the user as a single continuous sip from the attachment. Such an attachment may contain the liquid in a selective dispensing arrangement which permits a limited quantity of the liquid to be dispensed to a mouthpiece before the beverage reaches the mouthpiece.

FIGS. 8A and 8B are schematic cross-section views of another of an attachment 100 for a beverage container 200, with like components shown with the same reference sign as those used in FIGS. 6 and 7. As described above, in contrast to the example attachment 100 illustrated in FIGS. 6 and 7, in the example illustrated in FIGS. 8A and 8B the cap 110 is press fit against the opening 204 in the beverage container 200 in order to attach to and seal the beverage container 200 and only a portion of the container 130 may be located within the cap 110. The restrictor 140 of the example illustrated in FIGS. 8A and 8B also comprises one or more holes 142 and the restrictor 140 also has an open and a closed position, with FIG. 8A illustrating the attachment 100 with the restrictor 140 in the closed position and FIG. 8B illustrating the attachment 100 with the restrictor 140 in the open position. The restrictor 140 of the example illustrated in FIGS. 8A and 8B therefore functions in the same manner as described above with respect to the example illustrated in FIGS. 7A and 7B.

Thus there has now been described another example of an attachment 100 for a beverage container 200 that can be used to sequentially dispense a liquid 190 and a beverage 290 having differing tastant concentrations for consumption by a user in a manner perceived by the user as a single continuous sip from the attachment.

Figure 9A:
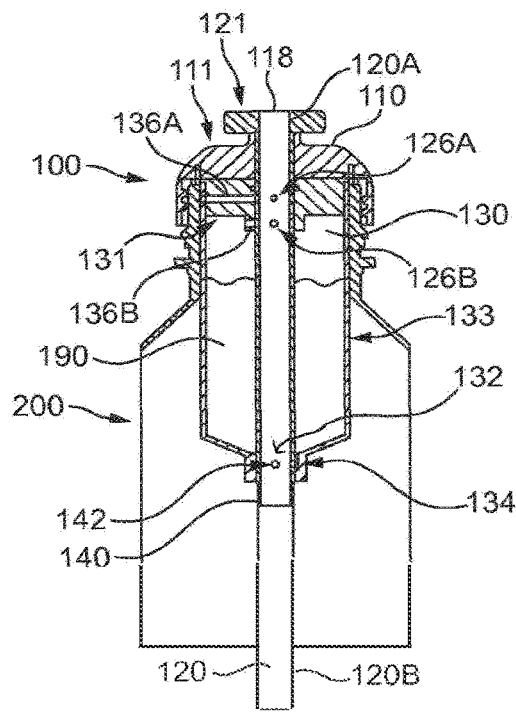
FIGS. 9A and 9B are schematic cross-section views of another example of an attachment for a beverage container.
Figure 9B:
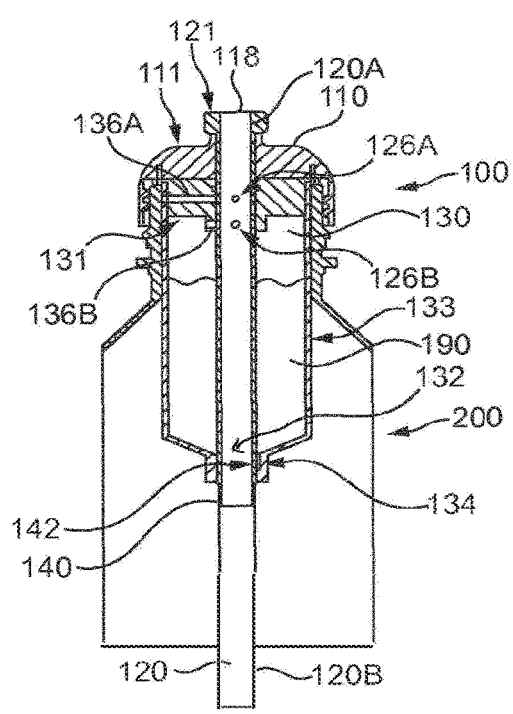

FIGS. 9A and 9B are schematic cross-section views of another example of an attachment 100 for a beverage container 200, with like components shown with the same reference sign as those used in FIGS. 6-8. The lower portion of the tube 120 in FIGS. 9A and 9B has been omitted for ease of illustration. The restrictor 140 of the example illustrated in FIGS. 9A and 9B also comprises one or more holes 142 and the restrictor 140 also has an open and a closed position, with FIG. 9A illustrating the attachment 100 with the restrictor 140 in the closed position and FIG. 9B illustrating the attachment 100 with the restrictor 140 in the open position. In contrast to the examples illustrated in FIGS. 6-8, in the example illustrated in FIGS. 9A and 9B the restrictor 140 is rotated in order to transition from the closed position to the open position. Rotating the restrictor about an axis running from the first end 121 of the tube 120 to the second end 122 of the tube 120 rotates the one or more holes 142 in the restrictor 140 relative to the container 130, thereby creating the opening 132 in the container 130 such that the liquid 190 is able to flow from the container 130 inwards into the tube 120 by passing through the one or more holes 142. In the example illustrated in FIGS. 9A and 9B, only the top portion 120A of the tube 120 corresponding to section of the tube 120 containing the restrictor 140 is rotated. The remaining portion 120B of the tube 120 remains fixed and is not rotated. Alternatively, the entire tube 120 may be rotated when the restrictor 140 is translated from the closed position to the open position and vice-versa.

Figure 10A:
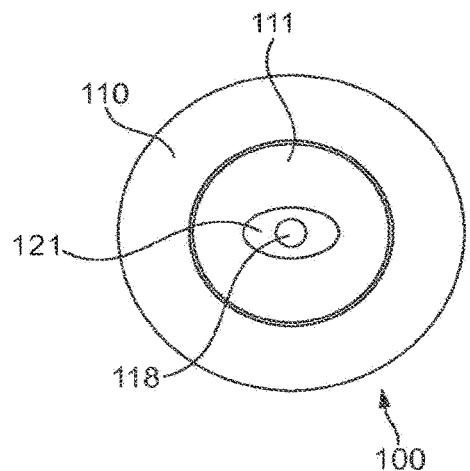
FIGS. 10A and 10B are top down views of the attachment for a beverage container illustrated in FIGS. 9A and 9B respectively.
Figure 10B:
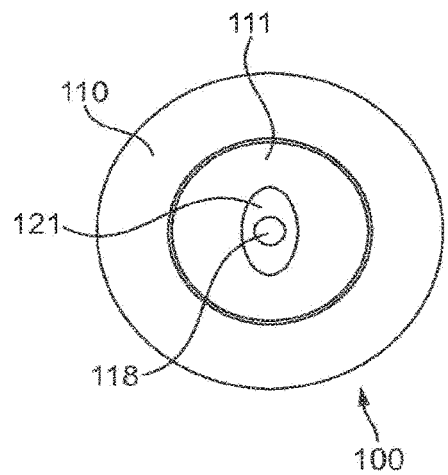

In the example illustrated in FIGS. 9A and 9B, the one or more side walls 133 of the container 130 are shaped so as to provide a trough 134 on one side of the container 130. When the restrictor 140 is in the closed position as illustrated in FIG. 9A, the one or more holes 142 in the restrictor 140 are not aligned with the trough 134 on one side of the container 130, such that the liquid 190 is prevented from flowing from the container 130. When the restrictor 140 is rotated into the open position as illustrated in FIG. 9B, the one or more holes 142 in the restrictor are aligned with the trough 134 on the side of the container 130, such that the liquid 190 is able to flow from the container 130 inwards into the tube 120 by passing through the one or more holes 142. The container 130 may be configured to have a plurality of troughs 134 around the perimeter of the container, such that the restrictor 140 may be rotated through a predetermined angle until one of the one or more holes 142 is aligned with a trough 134. For example, if the container 130 has two troughs 134 on opposite sides of the container 130 and the restrictor 140 has two holes 142 on opposite sides of the restrictor would be rotated through 90 degrees in order to transition from the closed position to the open position and vice-versa. This is illustrated in FIGS. 10A and 10B, which illustrate top down views of the attachment illustrated in FIGS. 9A and 9B respectively. FIG. 10A shows the first end 121 of the tube 120 when the restrictor in the closed position and FIG. 10B shows the first end 121 of the tube 120 when the restrictor is the open position. In this example, the first end 121 of the tube 120 is oval shaped in cross-section in order to provide a visual indicator to the user as to which position the restrictor 140 is in. Alternatively, the first end 121 of the tube 120 may be any other shape with discrete rotational symmetry. As can be seen in FIGS. 10A and 10B, the orientation of the major axis the oval shaped first end 121 of the tube 120 in the open and closed positions is 90 degrees different.

In the example illustrated in FIGS. 9A and 9B, the tube 120 also comprises one or more holes 126A, 126B and the container comprises one or more vents 136A, 136B, thereby allowing air to enter the container. When the top portion 120A of the tube 120 corresponding to section of the tube 120 containing the restrictor 140 is in the open position, the holes 126A, 126B are aligned with vents 136A, 136B located towards a first end 131 of the container 130, the first end of the container being at the opposite end to the opening 132 in the container 130. When the holes 126A, 126B are aligned with the vents 136A, 136B, air is able to flow into the first end 121 of the tube 120, along the tube 120, through the holes 126A, 126B into the vents 136A, 136B and into the container 130. Alternatively, the vents 136A, 136B may be in the one or more side walls 133 of the container 130 to allow air to enter the container 130 from outside the attachment 100 by directly entering the vent without first having to pass along the tube 120. The vents 136A, 136B thus act to prevent a vacuum from forming inside the container 130 as the liquid 190 exits the container 130, thereby preventing either or both of deformation of the container 130 and reduced flow rate of the liquid 190 out of the container 130.

Thus there has now been described another example of an attachment 100 for a beverage container 200 that can be used to sequentially dispense a liquid 190 and a beverage 290 having differing tastant concentrations for consumption by a user in a manner perceived by the user as a single continuous sip from the attachment.

FIGS. 11A-D are schematic cross-section views of another example of an attachment 100 for a beverage container 200, with like components shown with the same reference sign as those used in FIGS. 6-10. The restrictor 140 of the attachment 100 illustrated in FIGS. 11A-D is substantially the same as described above in respect of the example illustrated in FIGS. 9 and 10. In the example illustrated in FIGS. 11A-D, the restrictor has a plurality of open positions, wherein a different volume of the liquid 190 can flow from the container 130 in each of the plurality of open positions. The restrictor 140 is rotated in order to transition between each of the plurality of open positions. The restrictor 140 in the example illustrated in FIGS. 11A-D comprises a plurality of holes 142A-C. Each hole of the plurality of holes 142A-C has a different diameter, with hole 144A having the smallest diameter, and hole 144C having the largest diameter. Rotating the restrictor 140 between each of the plurality of open positions changes the diameter of the hole 144A-C the liquid 190 is able to flow from the container 130 through, thereby changing the flow rate of the liquid 190 and the volume of liquid 190 that can flow from the container 130 in each of the open positions.

Figure 11A:
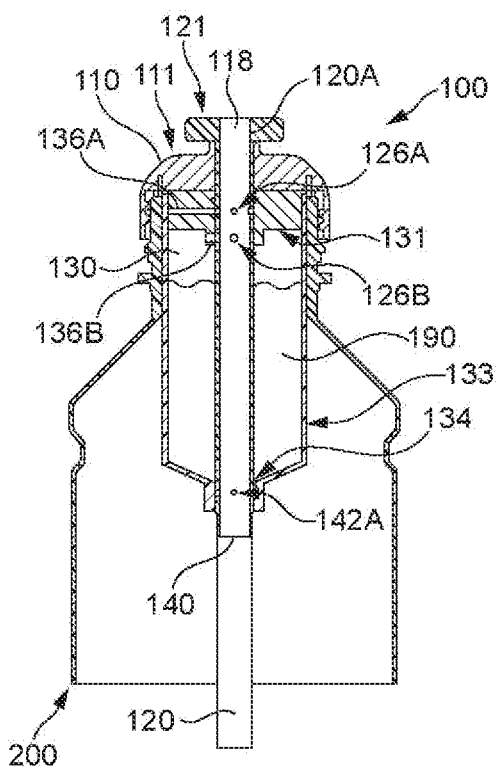
FIGS. 11A-D are schematic cross-section views of another example of an attachment for a beverage container.
Figure 11B:
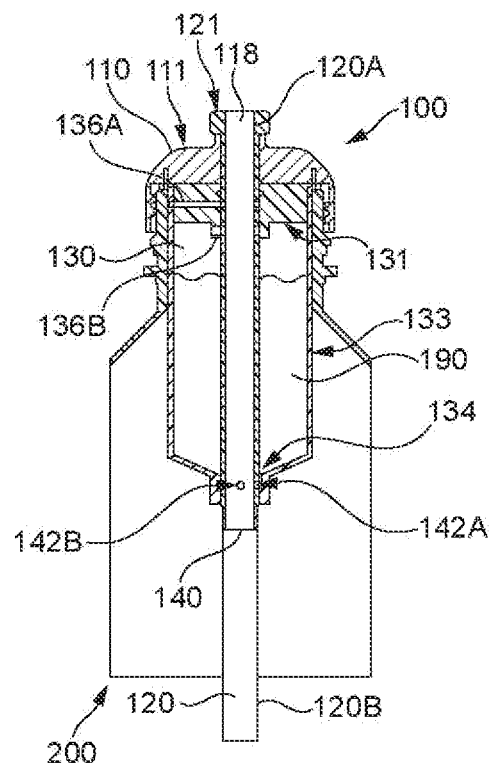
Figure 11C:
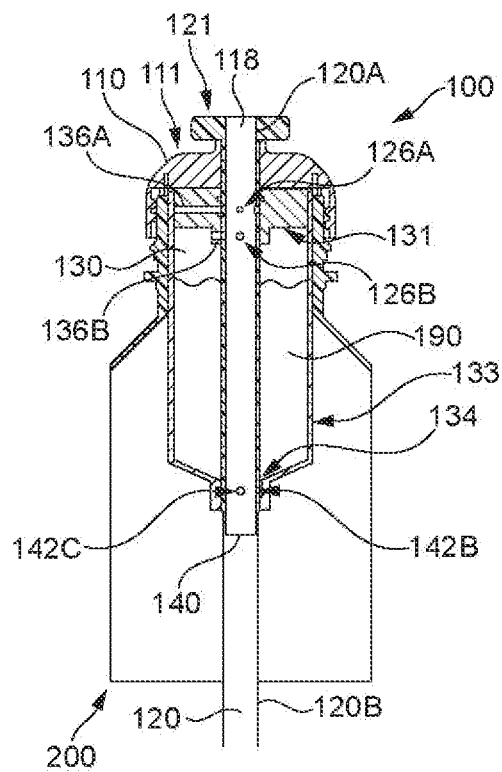
Figure 11D:
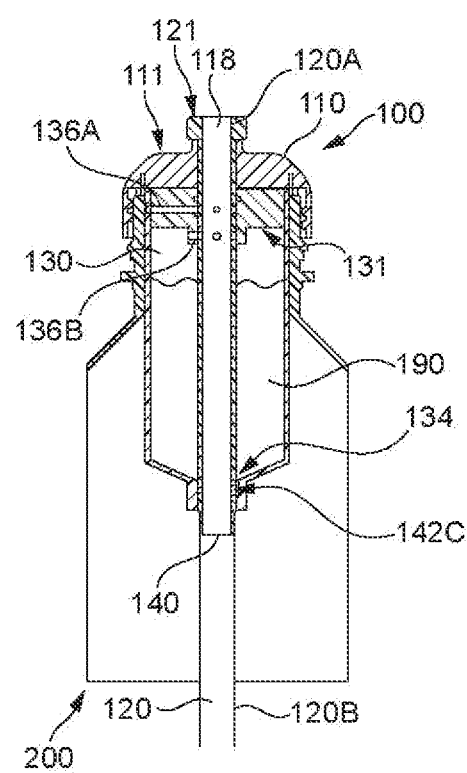

FIG. 11A illustrates the attachment 100 with the restrictor 140 in the closed position and FIGS. 11B-D illustrate the attachment 100 with the restrictor 140 in each of the open positions. In the example illustrated in FIG. 11A, none of the plurality of holes 142A-C are aligned with the trough 134, and therefore no liquid 190 is able to flow from the container 130.

In order to transition the restrictor 140 from the closed position as illustrated in FIG. 11A to the first open position as illustrated in FIG. 11B, the top portion 120A of the tube 120 corresponding to section of the tube 120 containing the restrictor 140 is rotated through 90 degrees about an running from the first end 121 of the tube 120 to the second end 122 of the tube 120. In the first open configuration, hole 142A is aligned with the tough 134, and therefore the liquid 190 can flow into the trough 134 and out of the container 130 through hole 142A.

In order to transition the restrictor 140 from the first open position as illustrated in FIG. 11B to the second open position as illustrated in FIG. 11C, the top portion 120A of the tube 120 corresponding to section of the tube 120 containing the restrictor 140 is rotated in the same direction through a further 90 degrees, such that the top portion 120A of the tube 120 corresponding to section of the tube 120 containing the restrictor 140 is rotated through 180 degrees to transition from the first open position to the second open position. In the second open configuration, hole 142B is aligned with the tough 134. Hole 142B has a larger diameter than hole 142A, and therefore more of the liquid 190 can flow into the trough 134 and out of the container 130 through hole 142B than when the restrictor 140 is in the first open position.

In order to transition the restrictor 140 from the second open position as illustrated in FIG. 11C to the third open position as illustrated in FIG. 11D, the top portion 120A of the tube 120 corresponding to section of the tube 120 containing the restrictor 140 is rotated in the same direction through a further 90 degrees. Hole 142C has a larger diameter than hole 142A and hole 142B, and therefore more of the liquid 190 can flow into the trough 134 and out of the container 130 through hole 142C than when the restrictor 140 is in the first open position or the second open position.

The top portion 120A of the tube 120 may be configured to allow further rotation of the restrictor such that the restrictor can be transitioned from the third open position to the closed position by rotating the top portion 120A of the tube 120 corresponding to section of the tube 120 containing the restrictor 140 in the same direction through a further 90 degrees. Alternatively, the top portion 120A of the tube 120 may be configured with a stop to prevent further rotation of the portion of the tube 120 once the restrictor is in the third open position, such that the top portion 120A of the tube 120 must be rotated in the opposite direction through 270 degrees in order to transition the restrictor from the third open position back to the closed position.

Alternatively, the restrictor may comprise an elongate slot, wherein in each of the plurality of open positions a different cross-sectional area of the elongate slot is aligned with the trough 136 in the container 130, thereby changing the volume of the liquid 190 that can flow from the container in each of the plurality of open positions.

It will be appreciated that amount of rotation required to transition between each of the positions of the restrictor and the number of open positions of the restrictor are for illustration purposes, and that any interval of rotation may be used in combination with any number of open positions. Also, the amount of rotation required to transitions between different positions may be different. For example, a 90 degree rotation may be required to transition from the closed position to the open position, followed by a 45 degree rotation in order to transition between each of the open positions. Alternatively, the restrictor may be configured such that, when in the closed position, rotation of the top portion 120A of the tube 120 corresponding to section of the tube 120 containing the restrictor 140 in a first direction will transition the restrictor 140 to a first open position whilst rotation of the top portion 120A of the tube 120 corresponding to section of the tube 120 containing the restrictor 140 in the direction opposite to the first direction will transition the restrictor 140 to a second open position.

Thus there has now been described another example of an attachment 100 for a beverage container 200 that can be used to sequentially dispense a liquid 190 and a beverage 290 having differing tastant concentrations for consumption by a user in a manner perceived by the user as a single continuous sip from the attachment.

Figure 12A:
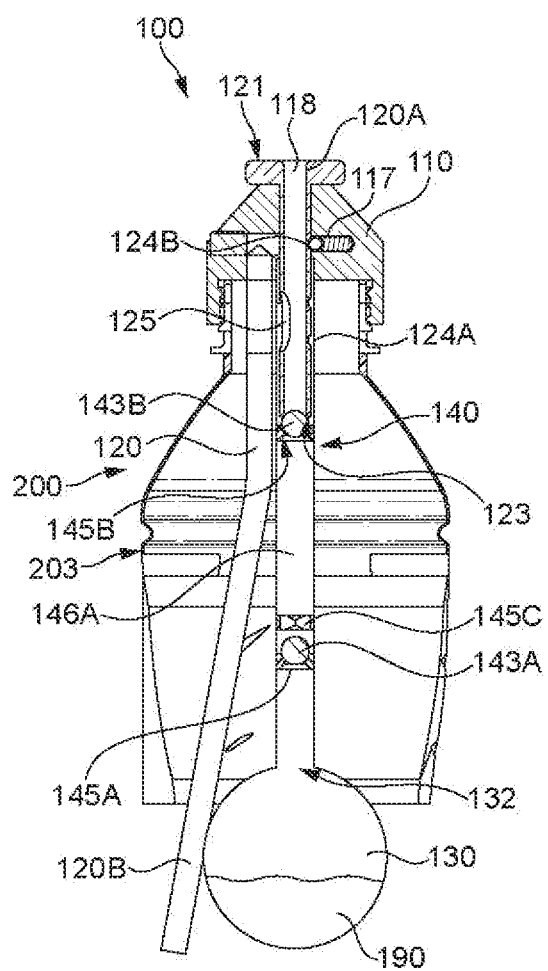
FIGS. 12A-D are schematic cross-section views of another example of an attachment for a beverage container.
Figure 12B:
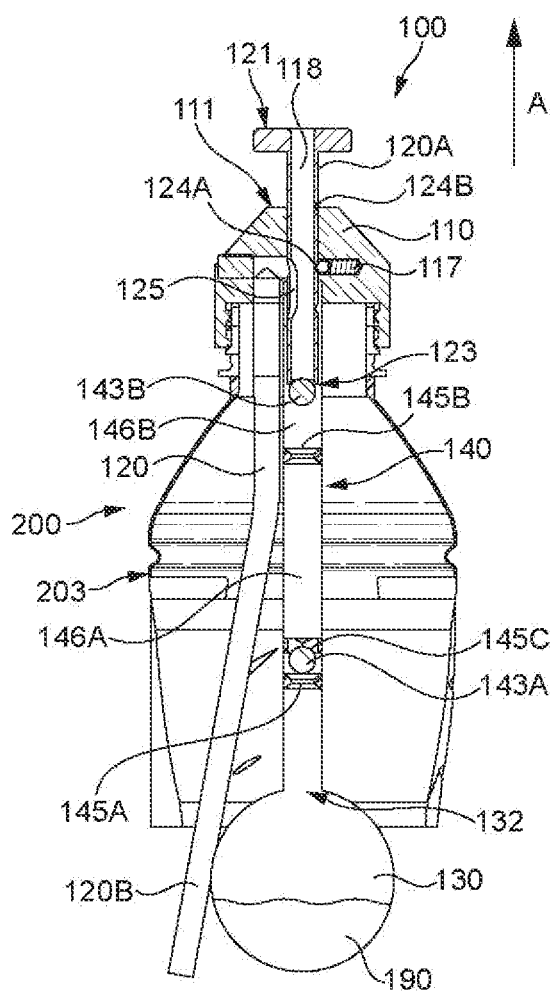

FIGS. 12A-D are schematic cross-section views of another example of an attachment 100 for a beverage container 200, with like components shown with the same reference sign as those used in FIGS. 6-11. The lower portion of the beverage container 200 in FIGS. 12A-D has been omitted for ease of illustration. In the example illustrated in FIGS. 12A-D, the restrictor 140 has an open and a closed position. FIG. 12A illustrates the attachment 100 for a beverage container 200 with the restrictor 140 in the closed position and FIG. 12B illustrates the attachment 100 for a beverage container 200 with the restrictor 140 in the open position. The restrictor 140 is translated in a first direction, as indicated by the arrow A, in order to transition the restrictor 140 from the closed position to the open position. In the embodiment illustrated in FIGS. 12A-D, only the top portion 120A of the tube 120 corresponding to section of the tube 120 containing the restrictor 140 is translated in the first direction. The remaining portion 120B of the tube 120 remains fixed and is not translated. This means that the second end 122 of the tube 120 remains in a fixed position relative to the beverage container 200, for example a predetermined distance from the second end 202 of the container (not shown).

In the example illustrated in FIGS. 12A-D, the top portion 120A of the tube 120 has one or more grooves or slots 124A, 124B. The slots 124A and 124B are configured to engage with a spring-loaded latch 117 in the cap 110 in order to secure and hold the restrictor 140 in the open and closed positions such that a force is required to transition the restrictor 140 from the closed position to the open position and vice-versa. This also prevents misuse of the attachment 100, for example by preventing the user from translating the restrictor 140 and the top portion 120A of the tube 120 too far in the first direction A. It will be appreciated that, whilst the illustrated embodiment employs one or more slots and a spring-loaded latch 117, any form of biasing means may be used in order to hold the restrictor in either the closed position or the open position.

In the example illustrated in FIGS. 12A-D the restrictor comprises a plurality of non-return valves 143A, 143B. The restrictor illustrated in FIGS. 12A-D comprises two ball valves 143A, 143B, a first ball valve 143A located towards the container 130 and a second ball valve 143B located towards the tube 120. Other types of non-return valve may be used, for example a rubber or silicone diaphragm valve, a lift-check valve, an in-line check valve or a duckbill valve. Equally, more than two non-return valves may be used, for example 3 or 5.

When the restrictor 140 is in the closed position, the first ball valve 143A is located in a first seat 145A, thereby preventing liquid 190 from flowing into the container 130 through the opening 132 in the container 130. When the restrictor 140 is in the closed position, the second ball valve 143B is located in a first seat 145B, thereby preventing liquid 190 from flowing towards the first ball valve 143A. When the restrictor 140 is in the closed position, the slit 125 in the top portion 120A of the tube 120 does not align with the remaining portion 120B of the tube 120. The top portion 120A of the tube 120 therefore blocks the remaining portion 120B of the tube 120, thereby preventing the beverage 290 from flowing along the tube 120 and out of the opening 118 in the cap 110.

When the restrictor 140 is in the open position and pressure is applied to the restrictor, for example by applying suction on the first end 121 of the tube, squeezing or otherwise applying pressure to the one or more sidewalls 203 of the beverage container 200 or tipping or tilting the attachment 100 and beverage container 200, the liquid 190 begins to flow out of the opening 132 in the container 130 and forces the first ball valve 143A out of the first seat 145A of the first ball valve 143A. This allows the liquid 190 to flow around the first ball valve 143A and towards the second ball valve 143B. The first ball valve 143A has a second seat 145C which limits the movement of the first ball valve 143A and prevents the first ball valve 143A from travelling along the restrictor 140 and contacting the second ball valve 143B. A spring or other biasing means may be used in place of the second seat 145C of the first ball valve 143A in order to limit the movement of the first ball valve 143A whilst also acting to return the first ball valve back into the first seat 145A. With the restrictor 140 in the open position, the liquid 190 flows towards the second ball valve 143B and forces the second ball valve 143B out of the first seat 145B of the second ball valve 143B. This allows the liquid 190 to flow around the second ball valve 143B, into the top portion 120A of the tube 120 and out of the opening 118 in the cap 110. With the restrictor 140 in the open position, the slit 125 in the top portion 120A of the tube 120 is aligned with the remaining portion 120B of the tube 120, thereby allowing the beverage 290 from flowing along the tube 120 and out of the opening 118 in the cap 110.

The top portion 120A of the tube 120 has a smaller cross-sectional area than the restrictor, and therefore the second end 123 of the top portion 120A of the tube 120 acts to limit the movement of the second ball valve 143B within in the restrictor. The second end 123 of the top portion 120A of the tube 120 may also have an internal chamfer which increases the contact area between the second end 123 of the top portion 120A of the tube 120 and the second ball valve 143B, thereby providing a better seal. When the restrictor 140 is in the closed position, the second end 123 of the top portion 120A of the tube 120 is in contact with the second ball valve whilst the ball valve also located in the first seat 145B of the second ball valve 143B, thereby preventing the second ball valve 143B from moving.

When the restrictor 140 is transitioned into the open position, the second end 123 of the top portion 120A of the tube 120 is moved away from the second ball valve. Applying pressure to the restrictor 140, for example by applying suction on the first end 121 of the tube, squeezing or otherwise applying pressure to the one or more sidewalls 203 of the beverage container 200 or rotating the attachment 100 and beverage container 200 thereby causes the liquid 190 to force the second ball valve 143B out of the first seat 145B of the second ball valve 143B. The second ball valve 143B is then forced along the restrictor 140 until it comes into contact with the second end 123 of the top portion 120A of the tube 120 and thus sealing the second end 123 of the top portion 120A of the tube 120. This prevents any further liquid from flowing into the second end 123 of the top portion 120A of the tube 120 whilst the restrictor is still in the opening configuration. Accordingly, only a portion of the liquid 190 is able to flow into the second end 123 of the top portion 120A of the tube 120 and out of the opening 118 in the cap 110. Applying further suction to the first end 121 of the tube 120, squeezing or otherwise applying further pressure to the one or more sidewalls 203 of the beverage container 200 or rotating the attachment 100 and beverage container 200 through a greater angle will only result in the beverage 290 flowing through the tube 120 and out of the opening 118 in the cap 110.

In order for the user to obtain more of the liquid 190 from the attachment 100, the pressure in the restrictor 140 must be reduced in order for the second ball valve 143B to return back to being located in first seat 145B of the second ball valve 143B. This may be achieved, for example, by reducing suction on the first end 121 of the tube, reducing pressure on the one or more sidewalls 203 of the beverage container 200 or tipping or tilting the attachment 100 and beverage container 200 such that the second ball valve 143B returns back to being located in first seat 145B of the second ball valve 143B under the influence of gravity. When the user wishes to take another sip, pressure is reapplied in the restrictor 140, for example by applying suction on the first end 121 of the tube, squeezing or otherwise applying pressure to the one or more sidewalls 203 of the beverage container 200 or rotating the attachment 100 and beverage container 200 such that the liquid 190 is able to force the second ball valve 143B out of the first seat 145B of the second ball valve 143B. Thus the operation of the second ball valve and the second end of the top portion of the tube permits a given quantity of the liquid to be dispensed per sip from the first end of the tube.

Figure 12C:
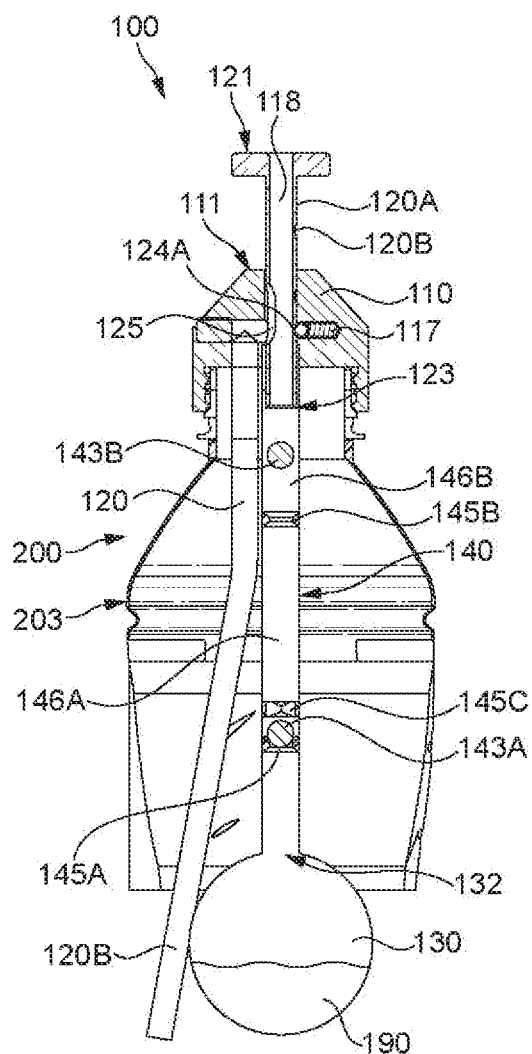
Figure 12D:
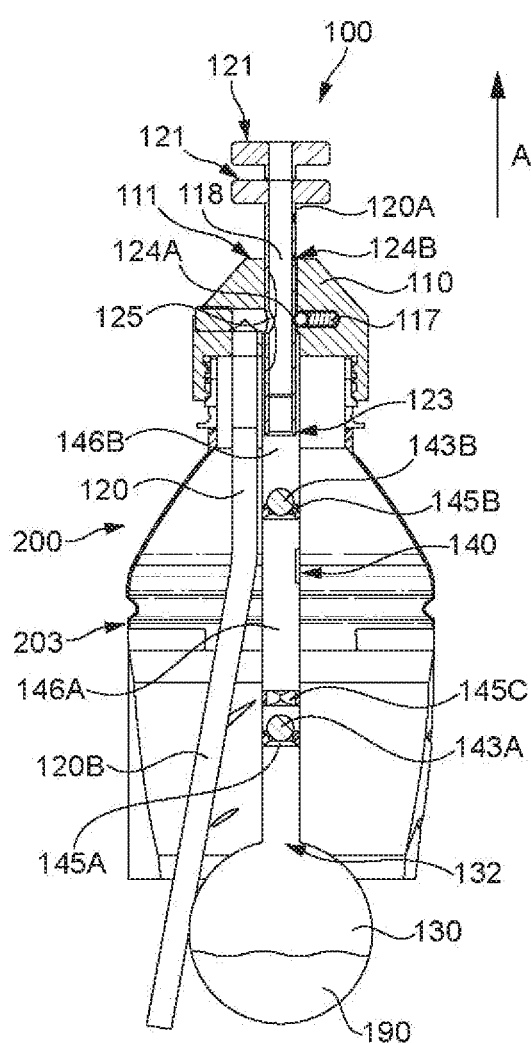

In the example illustrated in FIGS. 12A-D, the restrictor 140 has a plurality of open positions, wherein a different volume of the liquid 190 can flow from the container 130 in each of the plurality of open positions and the restrictor 140 is further translated in the first direction as indicated by the arrow A in order to transition between each of the plurality of open positions. FIG. 12B illustrates the attachment 100 for a beverage container 200 with the restrictor 140 in a first open position, FIG. 12C illustrates the attachment 100 for a beverage container 200 with the restrictor 140 in a second open position and FIG. 12D illustrates the attachment 100 for a beverage container 200 with a comparison between the position of the restrictor 140 in the first and second open positions as illustrated in FIGS. 12B and 12C respectively.

The distance between the lower non-return valve 143B and the upper non-return valve 143B defines a first volume 146A of the restrictor 140 in which the liquid 190 may collect. The distance between the first seat 145B of the second ball valve 143B and the second end 123 of the top portion 120A of the tube 120 defines a second volume 146B. The amount of liquid 190 which is delivered in each sip is dependent upon the second volume 146B. Accordingly, translating the restrictor 140 from the first open position as illustrated in FIG. 12B to the second open position as illustrated in FIG. 12C increases the distance between the first seat 145B of the second ball valve 143B and the second end 123 of the top portion 120A of the tube 120, thereby increasing the second volume 146B and thus the amount of liquid 190 that can be delivered with each sip. This also increases the distance the second ball valve 143B must travel in order to contact the second end 123 of the top portion 120A of the tube 120. This difference in distance is illustrated in FIG. 12D.

In an alternative embodiment, the first non-return valve 143A is a rubber or silicone diaphragm valve whilst the second non-return valve 143B is a ball valve, since the first non-return 143A only has to prevent the liquid 190 from flowing back into the container 130, whereas the second non-return valve 143A operates to prevent the liquid 190 from flowing back into the container 130 in between sips and to limit the maximum dispensed volume of liquid 190 per sip.

Thus there has now been described another example of an attachment 100 for a beverage container 200 that can be used to sequentially dispense a liquid 190 and a beverage 290 having differing tastant concentrations for consumption by a user in a manner perceived by the user as a single continuous sip from the attachment.

Figure 13A:
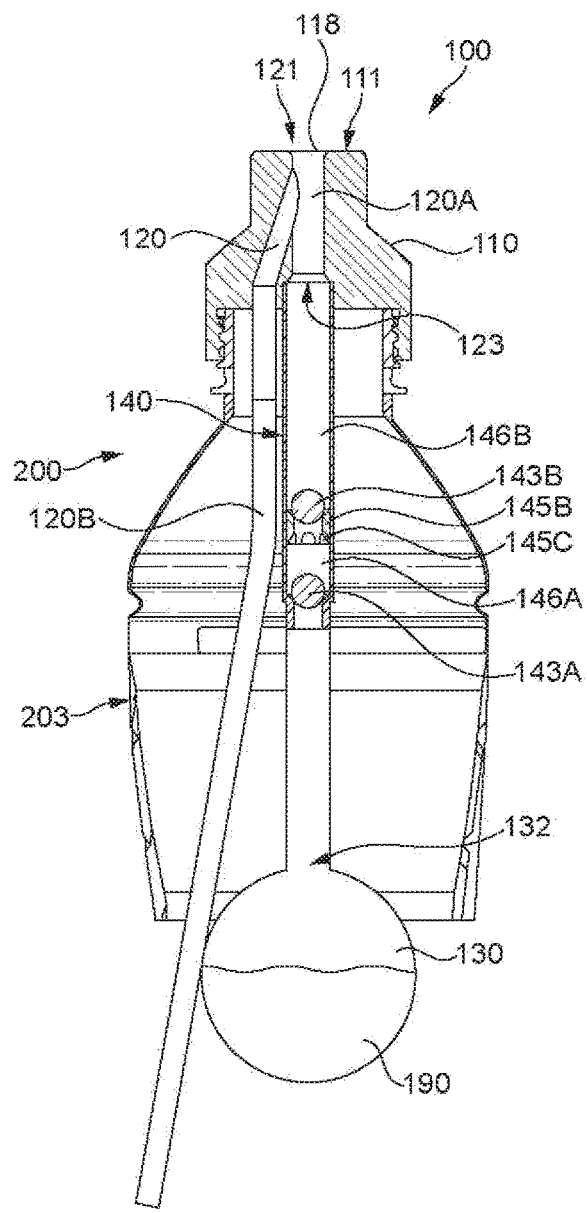
FIGS. 13A and 13B are schematic cross-section views of another example of an attachment for a beverage container.
Figure 13B:
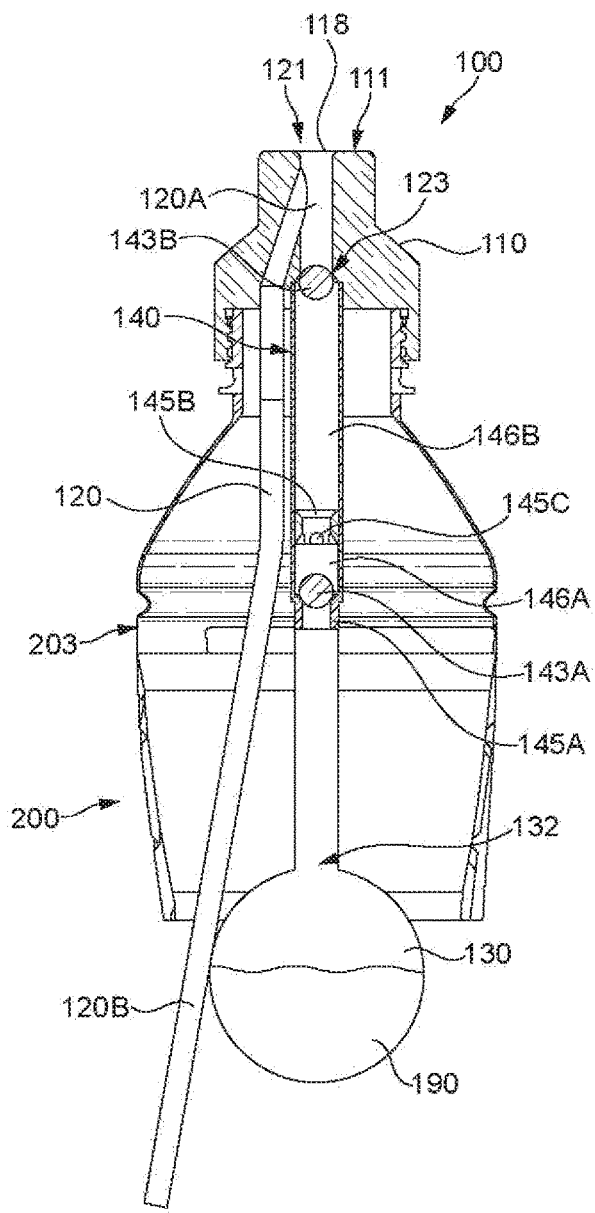

FIGS. 13A and 13B are schematic cross-section views of another example of an attachment 100 for a beverage container 200, with like components shown with the same reference sign as those used in FIGS. 6-12. In the example illustrated in FIGS. 13A and 13B the restrictor comprises a plurality of ball valves 143A, 143B. The operation of the ball valves 143A, 143B is substantially the same as described above in respect of the example illustrated in FIGS. 12A-D, with the exception that the second seat 145C of the first ball valve 143A and the first seat 145B of the second ball valve 143B are formed into a single component. The top portion 120A of the tube 120 is also entirely contained within the cap 110, such that, when the second ball valve 143B is in contact with the second end 123 of the top portion 120A of the tube 120, the second ball valve 143B is also in contact with the cap 110.

Thus there has now been described another example of an attachment 100 for a beverage container 200 that can be used to sequentially dispense a liquid 190 and a beverage 290 having differing tastant concentrations for consumption by a user in a manner perceived by the user as a single continuous sip from the attachment.

FIGS. 14A and 14B are schematic cross-section views of another example of an attachment 100 for a beverage container 200, with like components shown with the same reference signs as those used in FIGS. 6-13.

In the example illustrated in FIGS. 14A and 14B, the restrictor 140 has a plurality of open positions and a closed position, and the restrictor 140 is rotated in order to transition between the closed position and each of the plurality of open positions. The first end 141 of the restrictor 140 is contained within the cap 110 and is integrated with the cap 110 such that rotating the cap 110 causes the first end 141 of the restrictor 140 to be rotated and thus transitions the restrictor between the closed position and each of the plurality of open positions. The plurality of open positions can be provided, in some examples, as one or more discrete open positions, each of which provides for a variable degree of opening on a continuous or stepwise basis.

The top portion 120A of the tube 120 is also located entirely within the cap 110 such that rotating the cap 110 causes the top portion 120A of the tube to rotate. When the restrictor 140 is in the closed position, the top portion 120A of the tube 120 and the remaining portion 120B of the tube 120 are not aligned, and therefore the beverage 290 cannot flow out of the opening 118 in the cap 110. When the cap 110 is rotated such that the restrict is in one of the open positions, the top portion 120A of the tube 120 and the remaining portion 120B of the tube 120 are aligned such that the beverage 290 can flow out from the container 200, through the remaining portion 120B and the top portion 120A of the tube 120 and out of the opening 118 in the cap 110.

In the example illustrated in FIGS. 14A and 14B the restrictor comprises a ball valve 143A. The operation of the ball valve 143A is substantially the same as described above in respect of the example illustrated in FIGS. 12 to 14, with the exception that the upper extent of travel of the ball valve 143A is limited by a member 149 located towards the first end 141 of the restrictor 140. The member 149 is attached to the cap 110 such that, as the cap 110 is rotated, the member 149 is also rotated and translated away from the second end 147 of the restrictor 140. This increases the volume 146A and the distance between the member 149 and the seat 145A, thereby increasing the range of travel of the ball valve 143A. The restrictor is configured such that member 149 is through a different a different angle and thus translated a different distance in each of the open positions, thereby providing a different volume of the liquid 190 that can flow from the container 130 and through the restrictor 140 in each of the plurality of open positions. The member may be configured such that, when the restrictor 140 is in the closed position, the member is located proximate to the seat 145A such that the range of travel of the ball valve 143A is substantially zero.

Figure 15A:
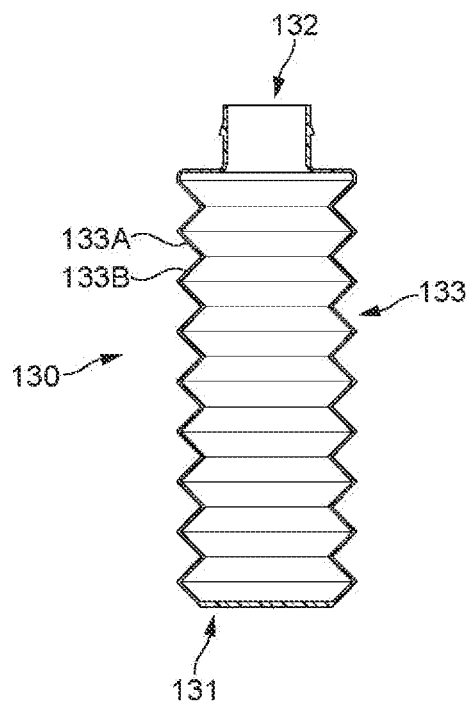
FIGS. 15A and 15B are schematic cross-section views of an example container of an attachment for a beverage container.
Figure 15B:
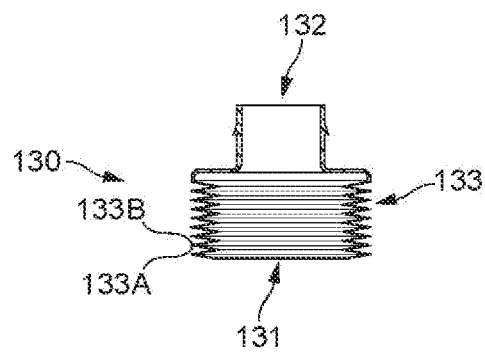
Figure 16A:
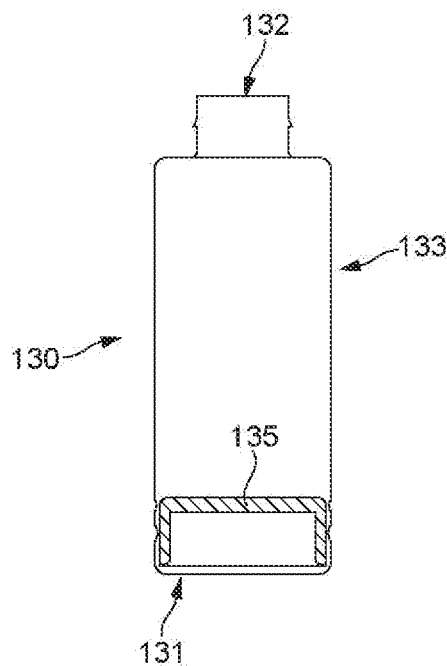
FIGS. 16A and 16B are schematic cross-section views of another example container of an attachment for a beverage container.
Figure 16B:
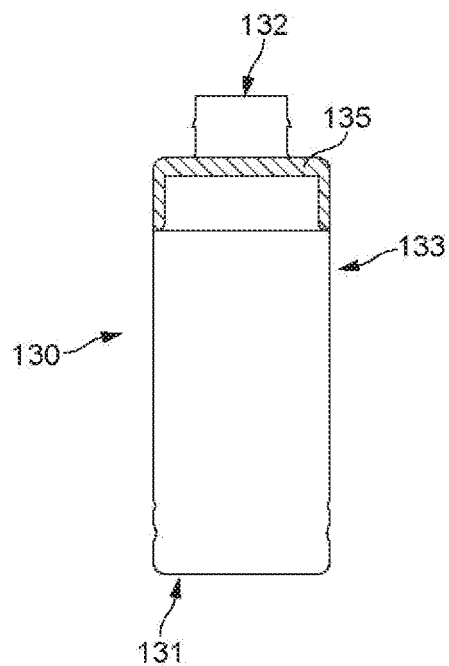

FIGS. 15 and 16 are schematic cross-section views of example containers 130 of an attachment 100 for a beverage container 200 for use with the attachment 100 and beverage container 200 illustrated in FIGS. 14A and 14B. The example containers 130 illustrated in FIGS. 15 and 16 are configured to be variable in volume. FIGS. 15A and 16A illustrate, respectively, the containers 130 in a first configuration with a first volume whilst FIGS. 15B and 16B illustrate, respectively, the containers 130 in a second configuration with a second volume. The first volume is greater than the second volume such that the first configuration can be referred to as the full or undeformed configuration whilst the second configuration can be referred to as the empty or deformed configuration. In the second configuration, the volume of liquid 190 that the container 130 is able to hold may be substantially zero.

In the example illustrated in FIGS. 15A and 15B, the side walls 133 of the container 130 comprise one or more creases or folds 133A, 133B. For example, the side walls 133 of the container 130 may comprise a plurality of folds 133A, 133B extending substantially from the first end 131 of the container 130 to the opening 132 in the container 130 such that the side walls form a concertina shape. In use, as the liquid 190 flows out of the container 130, the reduction in pressure in the container 130 causes the one or more folds 133A, 133B to close together, bringing the first end 131 of the container 130 towards the opening 132 in the container 130 and thus reducing the volume of the container 130. The one or more folds 133A, 133B allow the container 130 to be resiliently deformable, such that a decrease in pressure inside the container 130 will cause the container 130 to deform from the first configuration to the second configuration and an increase in pressure inside the container 130 will cause the container 130 to expand from the second configuration to the first configuration. Accordingly the restrictor 140 may comprise one or more non-return valves 143A, 143B, in order to prevent or restrict the liquid 190 from flowing back into the container 130 from the restrictor 140.

In the example illustrated in FIGS. 16A and 16B, a movable piston or base 135 is provided within the container 130. In the first configuration illustrated in FIG. 16A, the moveable base is located proximate to the first end 131 of the container 130 such that the liquid 195 can be contained between the movable base 135 and the opening 132 in the container 130. The movable base 135 is configured to slide within the container 130, whilst the cross-sectional shape of the moveable base 135 is configured to be substantially the same as the side walls 133 of the container 130 such that liquid 190 is unable to flow between the movable base 135 and the side walls 133 of the container. The moveable base 135 therefore provides a fluid tight seal across the container, in some optional examples additionally using a sealing element between the movable base 135 and the side walls 133 of the container. In use, as the liquid 190 flows out of the container 130, the reduction in pressure in the container 130 causes the moveable base 135 to be drawn away from the first end 131 of the container 130 and towards the opening 132 in the container 130 and thus reducing the volume of the container 130. The movable base 135 is configured to provide a friction fit against the side walls 133 of the container 130 such that the movable base can be drawn away from the first end 131 of the container 130 and towards the opening 132 in the container 130, but the moveable base 135 is prevented from moving back towards the first end 131 of the container 130. This means that, in use, the volume of the container 130 can only be decreased, thereby preventing any pressure increase in the container 130 causing the fluid 190 to flow back into the container 130 from the restrictor 140.

Thus there has now been described another example of an attachment for a beverage container that can be used to sequentially dispense a liquid and a beverage having differing tastant concentrations for consumption by a user in a manner perceived by the user as a single continuous sip from the attachment.

In each of the embodiments illustrated in FIGS. 6 to 11, the amount of liquid 190 which the user will receive with each sip is determined by the configuration of the restrictor 140 and the length of time between each sip. The longer the period of time between each sip, the greater the volume of liquid that can flow through the restrictor 140 and into the tube 120, and therefore the greater the amount of liquid 190 that will be received by the user in the next sip.

In each of the embodiments illustrated in FIGS. 12 to 14, the amount of liquid 190 which the user will receive with each sip is determined by the configuration of the restrictor 140, independent of the amount of time between sips. In particular, the first volume 146A and the second volume 146B of the restrictor 140 determines the volume of liquid 190 which can be stored in the restrictor 140 in between sips, and therefore volume of liquid 190 which will be delivered with each sip.

In each or any of the examples described above, the delivery of the liquid 190 and the beverage 290 may be sequential and/or overlapping. For overlapping delivery, the liquid 190 continues to flow out of the opening 118 in the cap 110 of the attachment 100 whilst the beverage 290 begins to flow out of the opening 118 in the cap 110 of the attachment 100. In other words, the delivery of the liquid 190 out of the attachment 100 overlaps with the delivery of the beverage 290 out of the attachment 100. In alternative approaches, the liquid 190 may be depleted from the attachment 100 before the beverage 290 begins to flow out of the opening 118 in the cap 110 of the attachment 100. In other words, the delivery of the liquid 190 out of the attachment 100 may be completed before the delivery of the second beverage 290 out of the attachment 100 commences. In dependency upon the tastant properties of the liquids and the tastant sensitivity of a tongue, the attachment may be configured to cause the liquid 190 be depleted from the attachment 100 a very short period of time after the beverage 290 begins to flow out of the opening 118 in the cap 110 of the attachment 100, thereby minimising the overlap between the delivery of the liquid 190 and the delivery of the beverage 290, while also avoiding a gap between delivery of the liquid and the beverage.

As discussed above, one of the liquid 190 and the beverage 290 contains a tastant which is essentially absent from the other liquid, or is present in a relatively differing amount. The composition of the liquid 190 and the beverage 290 may be essentially the same from the concentration of the tastant. For example, the liquid 190 and the beverage 290 may be substantially identical in terms of fats, air, proteins, macronutrients and carbohydrates, such that the liquid 190 and the beverage 290 comprise the same components in the same relative proportions apart from the presence of the tastant in one of the liquid 190 and the beverage 290. The liquid 190 and the beverage 290 may be visually the same. For example, the liquid 190 and the beverage 290 may have the same visual appearance, such as the colour, structure, texture, or any other obviously and directly perceivable property without tasting or smelling, such that the liquid 190 and the beverage 290 appear to have the same composition for users of the attachment 100 for a beverage container 200. The density and/or viscosity of the liquid 190 and the beverage 290 may be substantially the same. As will be appreciated by the skilled reader, the detection of and sensitivity to different tastants may be explained by the principle of chemesthesis.

The tastant may be sweet, salty, bitter, umami, sour and may have an associated aroma or texture. For example, a salty tastant may consist of one or more of sodium chloride, potassium chloride and ammonium chloride. A sweet tastant may consist of one or more of glucose, sucrose, fructose or galactose.

The beverage 290 may be a medicine, a nutraceutical or a dietary supplement. In this case, the beverage 290 may have a bitter or sour tastant associated with the composition of the medicine, the nutraceutical or the dietary supplement. This tastant may be essential absent from the liquid 190. When the liquid 190 and the beverage 290 are delivered from the attachment 100, for example into the mouth of a user, the liquid 190 flows out of the attachment 100 before the beverage 290. The user therefore tastes the liquid 190 before the bitter or sour beverage 290, given the user a more pleasant taste experience than if the beverage 290 were delivered at the same time or before the liquid 190.

The tastant in the combined beverage of the invention may comprise sodium chloride, for example the tastant may be sodium chloride. Humans have added common salt (sodium chloride) to their food for thousands of years and have grown accustomed to its taste. As a result, the most desirable saltiness profile is that obtained with sodium chloride. Sodium chloride can act to enhance the overall flavour of the food. The combined beverage according to the present approaches may contain 140 mg of sodium or less per 100 g of the total beverage. The U.S. Food and Drug Administration define meals and main dishes to be "low in sodium" if they contain 140 mg or less of sodium per 100 g.

The tastant in the combined beverage of the present approaches may comprise sucrose, for example the tastant may be sucrose or other sweetness component.

In the combined beverage to be dispensed from the attachment 100 for a beverage container 200 of the present examples, part of the liquid 190 and the part of the beverage 290 may consumable together followed by another part of the liquid 190 and another part of the beverage 290 together. For example the combined beverage may be such that a part of the first portion may be consumable with a part of the second portion in a series of such combinations, for example a series of at least 3 combinations, for example a series of at least 5 combinations, for example series of at least 10 combinations. The combined beverage of the invention may be such that the majority of the second portion by volume is consumable in a series of combinations comprising (for example consisting of) part of the first portion and part of the second portion together. Such combinations can be delivered by adjusting the relative flow rates of the liquid 190 and the beverage 290 from the attachment 100 for a beverage container 200 so as to alter the flow overlap of the liquid 190 and the beverage 290 as discussed above.

Aspects of the subject matter described herein are set out in the following numbered clauses:

1. An attachment for a beverage container comprising:
    a cap configured to attach to an opening in the beverage container, the cap comprising an opening;
    a tube passing through the cap, wherein the opening in the cap is located proximate to a first end of the tube and a second end of the tube is configured to be located within the beverage container when the cap is attached to the beverage container, such that a beverage contained in the beverage container can flow through the tube and out of the opening in the cap;
    a container attached to the tube and configured to hold a liquid, the container comprising an opening to allow the liquid to flow from the container into the tube and out of the opening in the cap; and
    a restrictor between the opening of the container and the tube to control and/or restrict the flow of the liquid from the container into the tube, the restrictor and the tube configured such that the liquid begins to exit the opening in the cap before the beverage begins to exit the opening in the cap.
2. The attachment of clause 1, wherein at least a portion of the container is located within the cap and the tube extends through the container.
3. The attachment of clause 2, wherein the container is located entirely within the cap.
4. The attachment of any one of the preceding clauses, wherein the restrictor has an open and a closed position, and wherein the restrictor in the closed position prevents the liquid from flowing from the container.
5. The attachment of clause 4, wherein the restrictor is translated in a first direction in order to transition from the closed position to the open position.
6. The attachment of clause 4 or clause 5, wherein the restrictor has a plurality of open positions, and wherein a different volume of the liquid can flow from the container in each of the plurality of open positions.
7. The attachment of clause 6, wherein the restrictor is further translated in the first direction in order to transition between each of the plurality of open positions.
8. The attachment of clause 7, wherein the restrictor comprises a plurality of holes, and translating the restrictor in the first direction changes the number of holes the liquid is able to flow from the container through.
9. The attachment of clause 6, wherein the restrictor is rotated in order to transition between each of the plurality of open positions.
10. The attachment of clause 9, wherein the restrictor comprises a plurality of holes, wherein each hole of the plurality of holes has a different diameter, and rotating the restrictor between each of the plurality of open positions changes the diameter of the hole the liquid is able to flow from the container through.
11. The attachment of any one of the preceding clauses, wherein the container comprises a vent to allow air to enter the container.
12. The attachment of any one of the preceding clauses, further comprising a second restrictor within the tube to control and/or restrict the flow of the beverage through the tube and out of the opening in the cap.
13. The attachment of clause 12, wherein the second restrictor is a non-return valve.
14. The attachment of any one of the preceding clauses, wherein the container is separable from the attachment and/or the beverage container.
15. The attachment of any one of the preceding clauses, wherein the container is located at an end of the beverage container distal to the opening in the beverage container.
16. The attachment of any one of the preceding clauses, wherein the container configured to be variable in volume.
17. A container for use with the attachment of any of clause 14 or any clause dependent thereon, the container configured to hold a liquid and configured to attach to dispense a held liquid to a tube of the attachment via an opening in the container.
18. A beverage dispensing system comprising:
    the attachment of any of clauses 1 to 16; and
    a beverage container comprising an opening, wherein the attachment is attached to the opening.
19. The beverage dispensing system of clause 18, wherein:
    the attachment comprises the attachment of clause 14; and
    the beverage container comprises an inlet opening configured to connect to a container to receive liquid therefrom.
20. The beverage dispensing system of clause 19, further comprising the container of clause 18.
21. An attachment for a beverage container comprising:
    a cap configured to attach to an opening in the beverage container, the cap comprising an opening;
    a tube passing through the cap, wherein the opening in the cap is located proximate to a first end of the tube and a second end of the tube is configured to be located within the beverage container when the cap is attached to the beverage container, such that a beverage contained in the beverage container can flow through the tube and out of the opening in the cap;
a container attached to the tube and configured to hold a liquid, the container comprising an opening to allow the liquid to flow from the container into the tube and out of the opening in the cap, wherein the container is located entirely within the cap; and
a restrictor between the opening of the container and the tube to control and/or restrict the flow of the liquid from the container into the tube, the restrictor and the tube configured such that the liquid begins to exit the opening in the cap before the beverage begins to exit the opening in the cap, wherein the restrictor has an open and a closed position, the restrictor in the closed position prevents the liquid from flowing from the container and the restrictor is translated in a first direction in order to transition from the closed position to the open position.

22. An attachment for a beverage container comprising:
a cap configured to attach to an opening in the beverage container, the cap comprising an opening;
a tube passing through the cap, wherein the opening in the cap is located proximate to a first end of the tube and a second end of the tube is configured to be located within the beverage container when the cap is attached to the beverage container, such that a beverage contained in the beverage container can flow through the tube and out of the opening in the cap;
a container attached to the tube and configured to hold a liquid, the container comprising an opening to allow the liquid to flow from the container into the tube and out of the opening in the cap; and
a restrictor between the opening of the container and the tube to control and/or restrict the flow of the liquid from the container into the tube, the restrictor and the tube configured such that the liquid begins to exit the opening in the cap before the beverage begins to exit the opening in the cap, wherein the restrictor has a closed position and a plurality of open positions, wherein the restrictor in the closed position prevents the liquid from flowing from the container and a different volume of the liquid can flow from the container in each of the plurality of open positions, the restrictor is translated in a first direction in order to transition from the closed position to one of the plurality of open positions and the restrictor is rotated in order to transition between each of the plurality of open positions.

23. An attachment for a beverage container comprising:
a cap configured to attach to an opening in the beverage container, the cap comprising an opening;
a tube passing through the cap, wherein the opening in the cap is located proximate to a first end of the tube and a second end of the tube is configured to be located within the beverage container when the cap is attached to the beverage container, such that a beverage contained in the beverage container can flow through the tube and out of the opening in the cap;
a container attached to the tube and configured to hold a liquid, the container comprising an opening to allow the liquid to flow from the container into the tube and out of the opening in the cap; and
a restrictor between the opening of the container and the tube to control and/or restrict the flow of the liquid from the container into the tube, the restrictor and the tube configured such that the liquid begins to exit the opening in the cap before the beverage begins to exit the opening in the cap, wherein the restrictor has a closed position and a plurality of open positions, wherein the restrictor in the closed position prevents the liquid from flowing from the container and a different volume of the liquid can flow from the container in each of the plurality of open positions, the restrictor is translated in a first direction in order to transition from the closed position to one of the plurality of open positions and the restrictor is further translated in the first direction in order to transition between each of the plurality of open positions.

24. An attachment for a beverage container comprising:
a cap configured to attach to an opening in the beverage container, the cap comprising an opening;
a tube passing through the cap, wherein the opening in the cap is located proximate to a first end of the tube and a second end of the tube is configured to be located within the beverage container when the cap is attached to the beverage container, such that a beverage contained in the beverage container can flow through the tube and out of the opening in the cap;
a container attached to the tube and located at an end of the beverage container distal to the opening in the beverage container, the container configured to hold a liquid, the container comprising an opening to allow the liquid to flow from the container into the tube and out of the opening in the cap, wherein the container is separable from the attachment and the beverage container and the container configured to be variable in volume; and
a restrictor between the opening of the container and the tube to control and/or restrict the flow of the liquid from the container into the tube, the restrictor and the tube configured such that the liquid begins to exit the opening in the cap before the beverage begins to exit the opening in the cap.

The skilled person will appreciate that these embodiments are provided only by way of example, and different features from different embodiments can be combined as appropriate without departing from the spirit and scope of the present teachings. Accordingly, the scope of the presently claimed invention is to be defined by the appended claims and their equivalents.

The invention claimed is:

1. A beverage dispensing system comprising:
an attachment comprising a cap attached to a beverage container opening in a beverage container, the cap comprising a cap opening and a tube passing through the cap, wherein the cap opening is located proximate to a first end of the tube, and a second end of the tube is located within the beverage container with the cap attached to the beverage container, such that the attachment is configured for a beverage contained in the beverage container to flow through the tube and out of the cap opening, the cap further comprises a liquid container attached to the tube and configured to hold a liquid, the liquid container comprising a liquid container opening to allow the liquid to flow from the container into the tube and out of the cap opening, the cap further comprises a restrictor between the liquid container opening and the tube for controlling and restricting the flow of the liquid from the liquid container into the tube, the cap further comprising a second restrictor within the tube, the restrictor, the second restrictor, and the tube configured such that the liquid begins to exit the cap opening before the beverage begins to exit the cap opening; and the beverage container comprising the beverage container opening, wherein the attachment is attached to the beverage container opening.

2. An attachment for a beverage container, the attachment comprising:

a cap configured to attach to an opening in the beverage container, the cap comprising an opening;

a tube passing through the cap, wherein the opening in the cap is located proximate to a first end of the tube, and a second end of the tube is configured to be located within the beverage container when the cap is attached to the beverage container, such that a beverage contained in the beverage container flows through the tube and out of the opening in the cap;

a container attached to the tube and configured to hold a liquid, the container comprising an opening to allow the liquid to flow from the container into the tube and out of the opening in the cap; and a restrictor between the opening of the container and the tube to have at least one function selected from the group consisting of controlling and restricting the flow of the liquid from the container into the tube, the restrictor and the tube configured such that the liquid begins to exit the opening in the cap before the beverage begins to exit the opening in the cap, wherein the attachment further comprises a second restrictor within the tube to control and/or restrict the flow of the beverage through the tube and out of the opening in the cap, wherein the second restrictor is a non-return valve.

* * * * *